(12) United States Patent
Mihara et al.

(10) Patent No.: US 11,239,493 B2
(45) Date of Patent: Feb. 1, 2022

(54) METHOD FOR BONDING SOLID ELECTROLYTE LAYER AND ELECTRODES, METHOD FOR MANUFACTURING FUEL CELL, AND FUEL CELL

(71) Applicant: Calsonic Kansei Corporation, Saitama (JP)

(72) Inventors: Teruyoshi Mihara, Saitama (JP); Tomihito Hashimoto, Saitama (JP)

(73) Assignee: Marelli Corporation, Saitama (JP)

( * ) Notice: Subject to any disclaimer, the term of this patent is extended or adjusted under 35 U.S.C. 154(b) by 70 days.

(21) Appl. No.: 16/337,596

(22) PCT Filed: Nov. 14, 2017

(86) PCT No.: PCT/JP2017/040859
§ 371 (c)(1),
(2) Date: Mar. 28, 2019

(87) PCT Pub. No.: WO2018/096971
PCT Pub. Date: May 31, 2018

(65) Prior Publication Data
US 2020/0036036 A1     Jan. 30, 2020

(30) Foreign Application Priority Data

Nov. 22, 2016   (JP) ............................ JP2016-226953
Jul. 24, 2017   (JP) ............................ JP2017-143030

(51) Int. Cl.
*H01M 10/0562*     (2010.01)
*H01M 8/0247*     (2016.01)
*H01M 8/1213*     (2016.01)

(52) U.S. Cl.
CPC ..... *H01M 10/0562* (2013.01); *H01M 8/0247* (2013.01); *H01M 8/1213* (2013.01)

(58) Field of Classification Search
CPC combination set(s) only.
See application file for complete search history.

(56) References Cited

U.S. PATENT DOCUMENTS

| | | |
|---|---|---|
| 5,049,458 A | 9/1991 | Sato et al. |
| 2008/0152983 A1 | 6/2008 | Horiuchi et al. |
| (Continued) | | |

FOREIGN PATENT DOCUMENTS

| | | |
|---|---|---|
| CN | 101330151 A | 12/2008 |
| CN | 101868875 A | 10/2010 |
| (Continued) | | |

OTHER PUBLICATIONS https://www.collinsdictionary.com/US/dictionary/english/dielectric-heating.*

*Primary Examiner* — Ula C Ruddock
*Assistant Examiner* — Sarika Gupta
(74) *Attorney, Agent, or Firm* — Global IP Counselors, LLP

(57) ABSTRACT

A method for bonding a solid electrolyte layer and electrodes used a fuel cell includes: laminating the solid electrolyte layer and the electrodes so that the electrodes sandwich the solid electrolyte layer therebetween; applying a first voltage of a first polarity between the electrodes sandwiching the solid electrolyte layer; and applying a second voltage of a second polarity that is the reverse of the first polarity between the electrodes sandwiching the solid electrolyte layer.

27 Claims, 31 Drawing Sheets

(56) References Cited

U.S. PATENT DOCUMENTS

| | | | |
|---|---|---|---|
| 2010/0291459 A1 | 11/2010 | Nishihara et al. | |
| 2011/0305976 A1* | 12/2011 | Tanahashi | H01M 8/249 |
| | | | 429/535 |
| 2014/0051009 A1 | 2/2014 | Ohno et al. | |
| 2016/0233534 A1* | 8/2016 | Leah | H01M 8/126 |
| 2019/0088959 A1* | 3/2019 | Fukuyama | H01M 8/0282 |

FOREIGN PATENT DOCUMENTS

| | | | |
|---|---|---|---|
| CN | 103534855 A | | 1/2014 |
| JP | 2003-051332 A | | 2/2003 |
| JP | 2005268039 A | * | 9/2005 |
| JP | 2008098152 A | * | 4/2008 |
| JP | 2008-159448 A | | 7/2008 |
| JP | 2009-046329 A | | 3/2009 |
| JP | 2009046329 A | * | 3/2009 |
| JP | 2010-027457 A | | 2/2010 |
| JP | 2013-206684 A | | 10/2013 |
| JP | 2015-035350 A | | 2/2015 |
| WO | 03/082460 A1 | | 10/2003 |

* cited by examiner

METHOD FOR BONDING SOLID ELECTROLYTE LAYER AND ELECTRODES, METHOD FOR MANUFACTURING FUEL CELL, AND FUEL CELL

CROSS-REFERENCE TO RELATED APPLICATIONS

This is a U.S. national phase application of PCT/JP2017/040859, filed on Nov. 14, 2017, which claims priority to Japanese Patent Application No. 2016-226953, filed on Aug. 3, 2016, and Japanese Patent Application No. 2017-143030, filed on Jul. 24, 2017. The entire disclosures of Japanese Patent Application Nos. 2016-153062 and 2017-143030 are hereby incorporated herein by reference.

TECHNICAL FIELD

The present invention relates to a method for bonding a solid electrolyte layer and electrodes, a method for manufacturing a fuel cell, and a fuel cell.

BACKGROUND ART

In the past, solid oxide type fuel cells using a solid electrolyte (Solid Oxide Fuel Cell, hereafter also called "SOFC" or "fuel cell") have been known as fuel cells. With the SOFC, a fuel cell that is a power generation unit (hereafter also called "unit cell") has a structure for which electrodes are provided on both surfaces of a solid electrolyte layer. Also, to obtain a desired voltage or current, a fuel cell stack for which a plurality of unit cells are laminated (hereafter also called "cell stack") is used.

As a method for forming the solid electrolyte layer in the SOFC, a wet method is used in which a paste of a solid electrolyte material is applied to the surface of an electrode, and after drying, firing is done at high temperature (see Japanese Laid-Open Patent Publication No. 2013-65518, for example).

SUMMARY

However, the SOFC undergoes great thermal stress due to heating cycles during the time from startup to stopping, rising from normal temperature (room temperature, for example) to the temperature during power generation (750° C. to 1000° C., for example), and again dropping to normal temperature.

However, with the SOFC formed using the wet method such as in Patent Document 1, there is a problem with durability, with cracks occurring in the solid electrolyte layer, or peeling occurring at the interface of the solid electrolyte layer and the electrodes due to repetition of the heating cycle.

The present invention was created with a focus on the problem noted above, and its purpose is to provide a method for manufacturing a fuel cell, and a fuel cell, having high durability with respect to repeated heating cycles accompanying starting and stopping.

To address the problem noted above, a method for manufacturing a fuel cell according to a first aspect is a method for manufacturing a fuel cell that comprises one or more solid electrolyte layers and a plurality of electrodes, wherein the method for manufacturing a fuel cell is characterized by including:

a laminating step for laminating the solid electrolyte layer and the electrodes, to make a laminate for which the electrodes are placed on both surfaces of the solid electrolyte layer, a first voltage application step for applying voltage of a first polarity between opposing electrodes sandwiching the solid electrolyte layer, and a second voltage application step for applying voltage of a second polarity that is the reverse of the first polarity between opposing electrodes sandwiching the solid electrolyte layer.

With the present invention, it is possible to obtain a fuel cell having high durability with respect to repeated heating cycles accompanying starting and stopping.

DETAILED DESCRIPTION OF EMBODIMENTS

Method for Manufacturing a Fuel Cell

Figure 1:
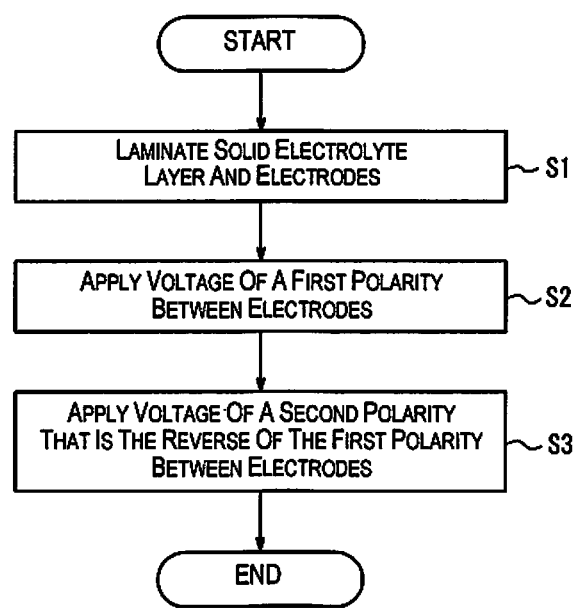
FIG. 1 is a flow chart of a method for manufacturing a fuel cell of the present invention.

Following, the method for manufacturing a fuel cell according to the present invention is explained while referring to the drawings. FIG. 1 shows a flow chart of the method for manufacturing a fuel cell according to the present invention. The method for manufacturing a fuel cell according to the present invention is a method for manufacturing a fuel cell that comprises one or more solid electrolyte layers and a plurality of electrodes, including: a laminating step (step S1) for laminating the solid electrolyte layer and the electrodes, to make a laminate for which the electrodes are placed on both surfaces of the solid electrolyte layer; a first voltage application step (step S2) for applying voltage of a first polarity between opposing electrodes sandwiching the solid electrolyte layer; and a second voltage application step (step S3) for applying voltage of a second polarity that is the reverse of the first polarity between opposing electrodes sandwiching the solid electrolyte layer.

The present invention is characterized by manufacturing a unit cell or a cell stack by bonding the solid electrolyte layer and the electrodes using an anode bonding method. With the anode bonding method, materials subject to bonding are put in contact, and while heating, DC voltage is applied so that, of the pair of electrodes sandwiching the solid electrolyte layer, the electrode for which to form a bond is plus (anode) and the other is minus (cathode). By doing this, in the solid electrolyte layer, oxygen ions are conducted toward the anode, and also a strong adhesive force is generated by electrostatic attraction at the anode side material interface. By the oxygen ions that moved to this interface being made to have a covalent bond with both substances of the interface, it is possible to strongly bond the forming materials. Following, each step of the present invention is explained using an example when forming unit cells.

Figure 2:
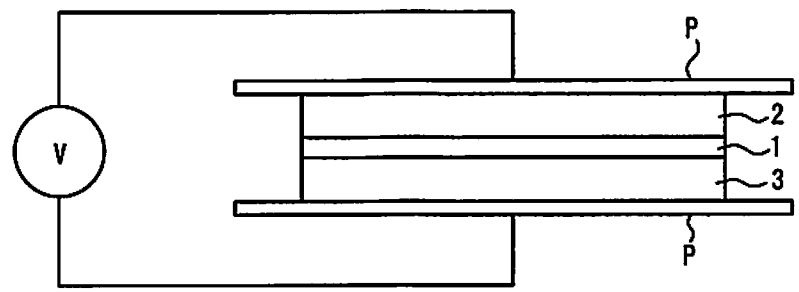
FIG. 2 is a drawing for explaining the method of forming a unit cell by bonding a solid electrolyte layer and electrodes using an anode bonding method.

First, at step S1, a laminating step is performed with which the solid electrolyte layer and the electrodes are laminated to make a laminate for which the electrodes are placed on both surfaces of the solid electrolyte layer. In specific terms, as shown in FIG. 2, between two electrode plates P connected to a voltage application device V, an electrode 3, a solid electrolyte layer 1, and an electrode 2 are laminated in this order to make the laminate.

With this specification, the structure before the electrodes are placed on both surfaces of the solid electrolyte layer, and the solid electrolyte layer and the electrodes are bonded is called the "laminate," and the structure after the solid electrolyte layer and the electrodes are bonded is called a "bonded body" or a "unit cell."

As the solid electrolyte layer 1, it is preferable to use an item that does not transmit gas but does transmit oxygen ions. As a material for the solid electrolyte layer 1, for example, it is possible to use a stabilized zirconia (YSZ) for which yttria ($Y_2O_3$) or neodymium oxide ($Nd_2O_3$), samaria ($Sm_2O_3$), gadolinium ($Gd_2O_3$), scandia ($Sc_2O_3$), etc. is in solid solution form. It is also possible to use a ceria solid solution such as samaria-doped ceria (SDC) or yttria-doped ceria (YDC), or gadolinium-doped ceria (GDC), or bismuth oxide ($Bi_2O_3$), lanthanum strontium magnesium gallate ($La_{1-x}Sr_xGa_{1-y}Mg_yO_3$): LSGM), etc.

The material of the solid electrolyte layer 1 is not limited to the items noted above, and it is possible to use other known solid electrolyte materials. Also, for these materials, it is possible to use one type alone, or to use a combination of a plurality of types.

For the abovementioned solid electrolyte layer 1, typically, it is possible to use an item obtained using a hot press method in which a powder of a raw material is mixed with an organic binder, pressure is applied to extend this to be thin, and pressure sintering is done in a high temperature oven. It is possible to produce a thinner film type solid electrolyte layer 1 using a sol-gel method.

Figure 3:
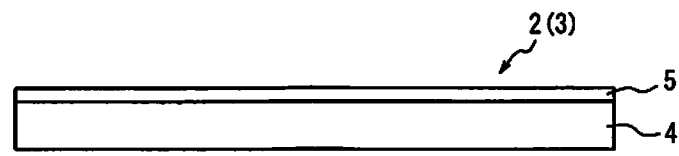
FIG. 3 is a drawing showing an electrode that has a support and an electrode layer.

With the electrodes 2, 3, one functions as an air electrode of a fuel cell, and the other functions as a fuel electrode. In the cell stack, to increase output, it is necessary to have the unit cells in thinner plate form, but to do that, it is necessary to increase the mechanical strength of the unit cells. In light of that, as shown in FIG. 3, it is preferable that the electrodes 2, 3 have a configuration that has a support 4 that is a base and an electrode layer 5 on the support 4.

The support 4 must be able to collect electrons of the electrode layer 5, and to supply fuel gas or oxidant gas to the solid electrolyte layer 1. As this kind of support 4, it is possible to use a nonwoven fabric or a porous material consisting of an electrically conductive material, a perforated metal of a single metal, an alloy, etc., in which many through holes are provided, etc.

Figure 4A:
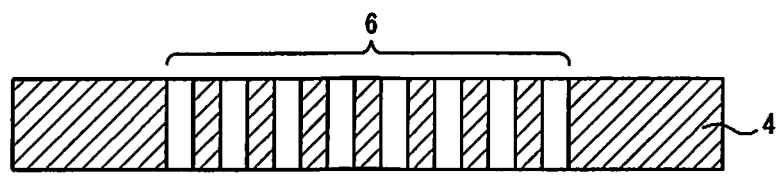
FIG. 4A is a drawing showing the support that has a perforated metal.

Among these, it is preferable that the support 4 have a perforated metal 6 as shown in FIG. 4A. The perforated metal 6 has many through holes formed on a metal plate with press working using a metal mold. With the perforated metal 6, by making the diameter of the through holes smaller and increasing density, the contact area of the electrodes with fuel gas or oxidant gas is increased, and it is possible to improve output density of the unit cell or the cell stack.

Figure 4B:
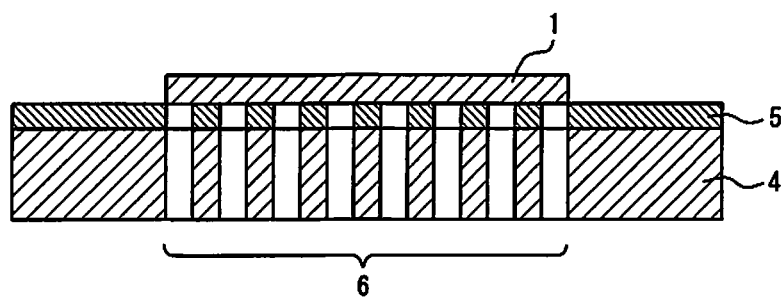
FIG. 4B is a drawing showing the support that has the perforated metal only at the portion at which the solid electrolyte layer and the electrode layer are in contact.

Also, when the support 4 has the perforated metal 6, to efficiently use the solid electrolyte layer 1 for power generation, it is preferable that the electrode layer 5 have the perforated metal 6 at the portion that contacts the electrolyte layer 1 as shown in FIG. 4B.

When the support 4 has the perforated metal 6, as the material of the support 4, it is preferable to use a material for which the coefficient of thermal expansion is close to that of the solid electrolyte material, and that can withstand a high temperature oxidation environment of 600° C. or greater. As the material having such characteristics, at this time, stainless steel (SUS) is optimal.

Also, as the material of the electrode layer 5, it is possible to use a material that can form a strong bond with the solid electrolyte layer 1 using the anode bonding method, that does not disappear when reacting with oxygen contained in the oxidant gas (air, for example), and that does not have an adverse effect on oxygen conduction by diffusing in the solid electrolyte layer 1 at high temperatures. For example, it is possible to use amorphous silicon (a-Si), nickel (Ni), etc. The a-Si produced using a vacuum deposition method is a material having such characteristics, also has excellent mechanical strength, and is also a suitable material because it shows good electrical conductivity as an electrode at anode bonding temperatures (300° C. to 600° C.) and at temperatures during normal operation (600° C. to 800° C.). Also, nickel is well known as a stable electrode material of the SOFC, and is a suitable material having high level results also as a barrier metal for suppressing an alloy reaction in a high temperature environment between multilayer materials.

The thickness of the support 4, in the case of a 100 mmΦ, solid electrolyte thickness 10 μm cell, for example, is preferably 50 μm or greater from the perspective of handling, though this is a rough guideline. Also, the thickness of the electrode layer 5 is preferably 0.1 μm or greater and 1 μm or less considering matching of conductive resistance and the coefficient of thermal expansion.

As the method for forming the electrode layer 5 on the support 4, in the case of a-Si, it is possible to use a vapor deposition or a chemical vapor deposition (Chemical Vapor Deposition, CVC) method, and in the case of Ni, to use an electroless plating method or a vacuum deposition method.

Figure 4C:
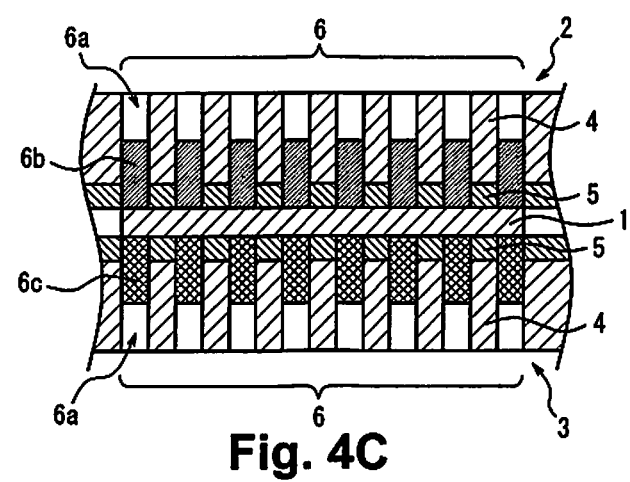
FIG. 4C is a drawing showing the perforated metal for which a porous material is filled in the openings.

As shown in FIG. 4C, it is preferable to fill a porous material 6b, 6c that functions as an air electrode as well as a fuel electrode in openings 6a of the perforated metal 6. By doing this, while maintaining good contact properties of the oxidant gas or the fuel gas with the solid electrolyte layer 1, the contact area between the electrodes 2, 3 and the solid electrolyte layer 1 is increased, and it is possible to improve power generating efficiency.

When the electrode 2 is the air electrode, as the porous material 6b filling the openings 6a, it is possible to use a known material for the air electrode that does not shift to a nonconductor due to an oxidation reaction. As this kind of material, examples include $(La, Sr)MnO_3$ (LSM), $(La, Sr)CoO_3$ (LSC), $(La, Sr)(Co, Fe)O_3$ (LSCF), etc.

Filling of the porous material 6b in the openings 6a can be performed after doing anode bonding of the electrodes 2, 3 to the solid electrolyte layer 1 in steps S2, S3 described later, for example, by implementing firing processing after applying a paste of the filling material on the surface of the perforated metal 6 of the electrode 2 and drying.

Also, when the electrode 3 is the fuel electrode, as the porous material 6c for filling the openings 6a, it is possible to use a known material for the fuel electrode that does not become nonconductive by decomposing due to a reduction reaction. Examples of this kind of material include Ni/YSZ cermet or Ru/YSZ cermet.

The filling of the porous material 6c in the openings 6a can be performed by, after the anode bonding of the electrodes 2, 3 to the solid electrolyte layer 1 in steps S2, S3 described later, for example, implementing firing processing after filling a raw material powder of the filling material in the openings 6a of the perforated metal 6 of the electrode 3.

In FIG. 4C, the openings 6a of the perforated metal 6 are not completely filled with the porous materials 6b, 6c, but the filling amount can be set as appropriate based on the porosity of the porous materials 6b, 6c, etc.

Next, in step S2, a first voltage application step for applying a voltage of a first polarity between opposing electrodes 2, 3 sandwiching the solid electrolyte layer 1 is performed. For example, by respectively connecting the electrode 2 to the positive electrode side of the voltage application device V and the electrode 3 to the negative electrode side, and applying a DC voltage between the electrode 2 and the electrode 3 while heating the solid electrolyte layer 1 and the electrodes 2, 3, it is possible to bond the solid electrolyte layer 1 and the electrode 2.

The voltage applied between the electrode 2 and the electrode 3 has an optimal range according to the work temperature, so is selected to be optimal according to the material of the solid electrolyte. When the temperature or the voltage is too low, the oxygen ion conducting current of the solid electrolyte is low, and the bonding time becomes long. On the other hand, when the temperature is high, the bonding time becomes shorter, but the residual stress after bonding is greater, which is unsuitable from the perspective of durability. For voltage as well, when it is too high, discharge to other than the bonding part occurs, and bonding becomes difficult. Typically, it is preferable to select an optimal value in a range of voltage 50 V or greater to 500 V or less under temperature conditions of 300° C. or greater to 500° C. or less. By doing this, it is possible to have stronger bonding of the solid electrolyte layer 1 and the electrodes 2, 3.

Next, the time for applying the voltage between the electrode 2 and the electrode 3 is explained. At the contact surface of the electrode 3 that becomes the negative electrode and the solid electrolyte layer 1, the oxygen in the air receives electrons from the negative electrode and ionizes, becoming oxygen ions. The generated oxygen ions move to inside the solid electrolyte layer 1, the electrons are transferred to the positive electrode at the interface with the electrode 2, and a strong covalent bond is formed with the constituent atoms of the solid electrolyte layer 1 and the electrode 2. In this way, the electrode 2 and the solid electrolyte layer 1 are chemically bonded. At this time, while the bonding formation area of the electrode 2 and the solid electrolyte layer 1 to which oxygen ions are supplied expands, the current shows an increasing trend. Then, when bonding is approximately completed, the current turns to decreasing. It is preferable to use this point at which the current value turns to decreasing as a guideline for stopping application of the voltage. By doing this, it is possible to have strong bonding across the entire bonding surface of the solid electrolyte layer 1 and the electrodes 2, 3.

Subsequently, in step S3, a second voltage application step is performed in which a voltage of a second polarity that is the reverse of the first polarity is applied between opposing electrodes sandwiching the solid electrolyte layer 1. For example, in the abovementioned first voltage application step, when the electrode 2 is connected to the positive electrode side of the voltage application device V and the electrode 3 is connected to the negative electrode side, and voltage is applied, in a state with those connections maintained, the polarity of the voltage of the voltage application device V is reversed and the DC voltage is applied, or a change is made with the electrode 2 connected to the negative electrode side of the voltage application device V and the electrode 3 connected to the positive electrode side, and the DC voltage is applied. By doing this, it is possible to bond the solid electrolyte layer 1 and the electrode 3 that were not bonded with the first voltage application step.

The conditions such as the voltage, voltage application time, heating temperature, etc., in the second voltage application step can be the same as the first voltage application step other than the polarity of the applied voltage.

Figure 5:
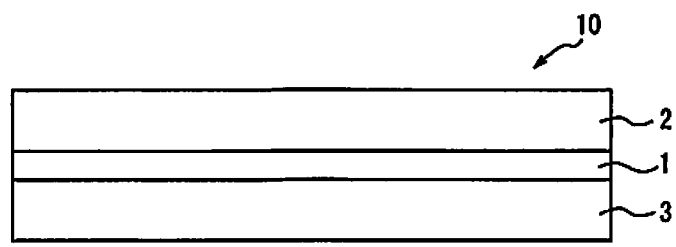
FIG. 5 is a drawing showing a bonded body (unit cell).

In this way, it is possible to bond the solid electrolyte layer 1 and the electrodes 2, 3, and to obtain a bonded body (unit cell) 10 as shown in FIG. 5.

Figure 6:
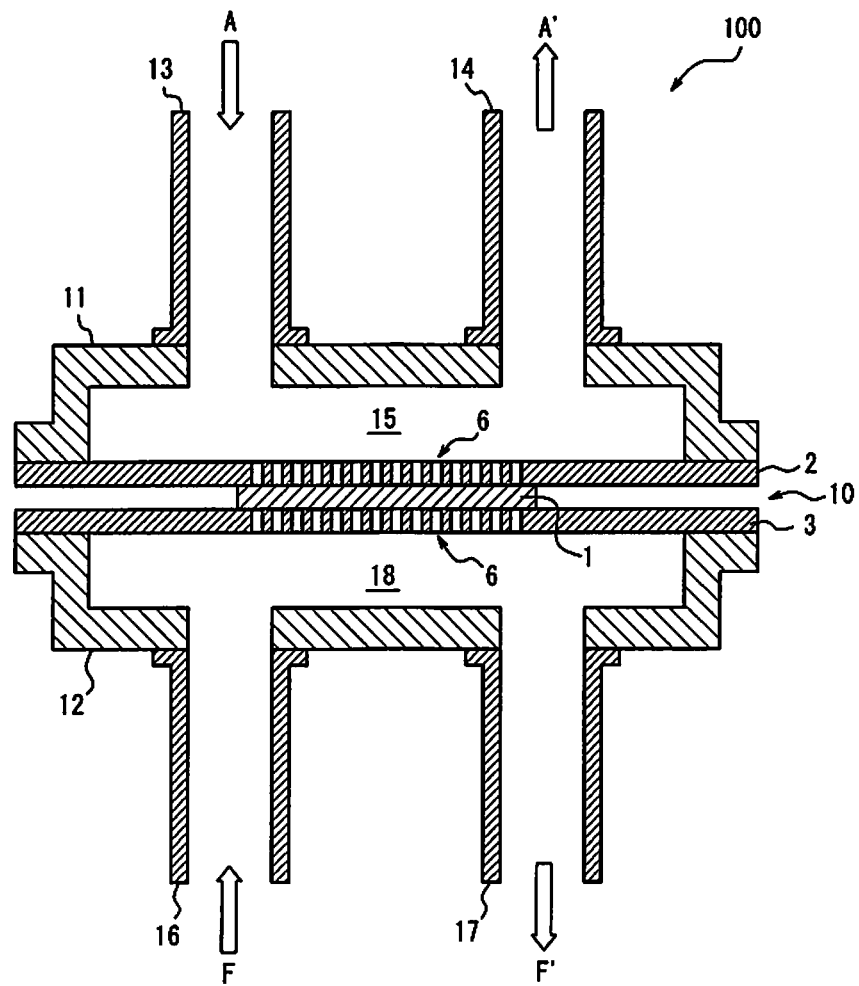
FIG. 6 is a drawing showing a configuration example of a fuel cell using the bonded body (fuel cell) obtained using the present invention.

FIG. 6 shows a configuration example of the fuel cell using the bonded body (unit cell) 10 obtained using the present invention. A fuel cell 100 shown in this drawing comprises the bonded body 10, an upper chamber 11, and a lower chamber 12. Also, an oxidant gas introduction pipe 13 and an oxidant off-gas exhaust pipe 14 are connected to the upper chamber 11, and an oxidant gas flow path 15 is partitioned by the oxidant gas introduction pipe 13, the upper chamber 11, the bonded body 10, and the oxidant off-gas exhaust pipe 14. Furthermore, a fuel gas introduction pipe 16 and a fuel off-gas exhaust pipe 17 are connected to the lower chamber 12, and a fuel gas flow path 18 is partitioned by the fuel gas introduction pipe 16, the lower chamber 12, the bonded body 10, and the fuel off-gas exhaust pipe 17.

Using this kind of fuel cell 100, while heating the bonded body 10 using a burner (not illustrated), etc., an oxidant gas A such as air, etc., is introduced from the oxidant gas introduction pipe 13, and a fuel gas F such as hydrogen, etc., is introduced from the fuel gas introduction pipe 16. Having done this, in the air electrode 2, oxygen contained in the oxidant gas A receives electrons from an external circuit (not illustrated) to become oxygen ions. The generated oxygen ions pass through the solid electrolyte layer 1 and move to the fuel electrode 3, and react with the fuel gas F. At that time, electrons are emitted and supplied to the external circuit. In this way, power generation is performed.

Figure 7A:
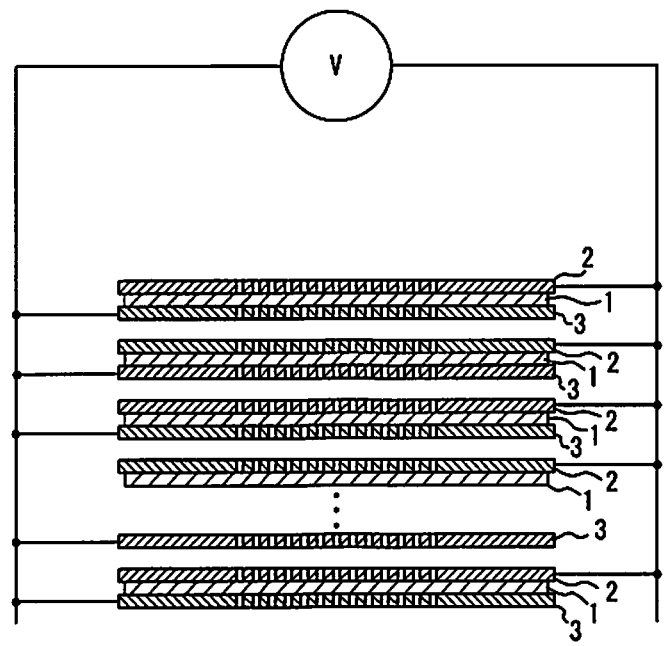
FIG. 7A is a drawing for explaining a method for anode bonding a plurality of laminates in the present invention.

Above, the present invention was explained with an example when forming the unit cell with the fuel cell comprising one layer of the solid electrolyte layer, but it is also suitable to apply the present invention when forming the cell stack with the fuel cell comprising a plurality of solid electrolyte layers. In specific terms, first, as shown in FIG. 7A, a plurality of laminates for which the electrodes 2, 3 are placed on both surfaces of the solid electrolyte layer 1 are laminated (step S1).

Next, for example, all of the electrodes 2 are connected to the positive electrode side of the voltage application device V, and all of the electrodes 3 are connected to the negative electrode side, and while heating all the solid electrolyte layers 1 and the electrodes 2, 3, DC voltage is applied between the electrode 2 and the electrode 3 (step S2). By doing this, all of the solid electrolytes 1 and the electrodes 2 are bonded.

Subsequently, the polarity of the voltage applied between the electrode 2 and the electrode 3 is reversed, or all of the electrodes 2 are connected to the negative electrode side of the voltage application device V, and all of the electrodes 3 are connected to the positive electrode side, and while heating all of the solid electrolyte layers 1 and the electrodes 2, 3, DC voltage is applied between the electrodes 2 and the electrodes 3 (step S3). By doing this, all of the solid electrolyte layers 1 and the electrodes 3 are bonded.

Figure 7B:
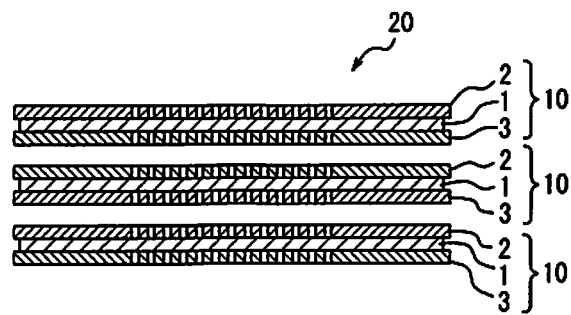
FIG. 7B is a drawing for explaining a method for anode bonding a plurality of laminates in the present invention.

In this way, even when the fuel cells form a plurality of solid electrolyte layers, specifically, a cell stack, using two voltage application steps (anode bonding), all the solid electrolyte layers 1 and the electrodes 2, 3 are bonded, and it is possible to obtain a cell stack 20 like that shown in FIG. 7B. In the cell stack 20 of FIG. 7B, the bonded body 10 is shown separated, but using the separators between each bonded body (not illustrated), overall this is configured as an integrated unit.

In this way, when the fuel cells comprise a plurality of solid electrolyte layers, specifically, when forming a cell stack, by using two voltage application steps (anode bonding), it is possible to bond all the solid electrolyte layers 1 and all the electrodes 2, 3.

Regarding a case when the fuel cells comprise one layer of the solid electrolyte layer, in the explanation described above, the electrode 3, the solid electrolyte layer 1, and the electrode 2 are laminated in this order and placed between two electrode plates P shown in FIG. 2, voltage is applied in a state with this as a laminate, and the bonded body 10 is obtained. However, after first placing only the electrode 3 and the solid electrolyte layer 1 between the two electrode plates P and bonding, even if the electrode 2 is placed above the solid electrolyte layer 1 and the solid electrolyte layer 1 and the electrode 2 are bonded, it is possible to obtain the bonded body 10 using two voltage application steps. The configuration forming the bonded body 10 in this way is also included in the present invention.

With the present invention, since the fuel cell is formed using a low temperature processing method (300 to 600° C.), when returned to normal temperature, it is possible to markedly reduce the residual stress received by the solid electrolyte layer 1 and the electrodes 2, 3. Compared to a conventional wet method in which there is exposure to firing temperature at temperatures of 1000° C. to 1500° C., it is possible to suppress the size of the residual stress to 20 to 60%. By doing this, it is possible to suppress the advance of mechanisms that degrade product life such as electrode material creep or intercrystalline cracks. Therefore, even under harsh conditions of repeated starting and stopping such as with a fuel cell of an automobile, it is possible to markedly improve durability.

Also, with the present invention, compared to when formed using the wet method, it is possible to improve the adhesive properties between the solid electrolyte layer 1 and the electrodes 2, 3, and as a result, it is possible to stabilize the output of the cell.

Furthermore, in the present invention, it is possible to omit the drying step and the firing step of the paste of the solid electrolyte material performed with the wet method, and using two voltage application steps (anode bonding), it is possible to bond all the solid electrolyte layers and all the electrodes, so it is possible to shorten the manufacturing time.

And furthermore, with the present invention, it is possible to easily perform making the unit cell into thinner plate form, and possible to improve the output density of the cell stack.

Above, based on the anode bonding method, using two voltage application steps, it was explained that it is possible to bond all the solid electrolyte layers and all the electrodes. As a result of progressing with further examination, the inventors discovered that, in the abovementioned step S1, when laminating the solid electrolyte layer and the electrodes to make the laminate for which the electrodes are placed on both surfaces of the solid electrolyte layer, the electrodes have an oxide layer on the surface, and the electrodes are placed on both surfaces of the solid electrolyte layer with the oxide layer interposed, and when the voltage application steps of step S2 and step S3 are performed, the bond is formed on the reverse surface to when there is no oxide layer.

Figure 25:
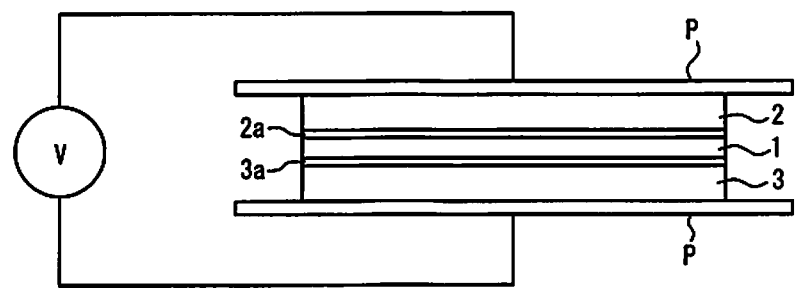
FIG. 25 is a drawing for explaining a method of forming the unit cell by bonding the solid electrolyte layer and the electrodes using a cathode bonding method.

In specific terms, in FIG. 2, when the electrodes 2 and 3 do not have the oxide layer on the surface, the electrode 2 is connected to the positive electrode side of the voltage application device V, and the electrode 3 is connected to the negative electrode side, and when a DC voltage is applied between the electrode 2 and the electrode 3 while heating the solid electrolyte layer 1 and the electrodes 2, 3, the solid electrolyte layer 1 and the electrode 2 are bonded. However, as shown in FIG. 25, when the electrodes 2 and 3 have oxide layers 2a, 3a on the surface, the solid electrolyte layer 1 and the electrode 3 are bonded with the oxide layer 3a interposed.

The abovementioned phenomenon is also the same when the polarity of the applied voltage is reversed, and compared to when the electrodes 2 and 3 do not have the oxide layer on the surface, and the solid electrolyte layer 1 and the electrode 3 are bonded, when the electrodes 2 and 3 have the oxide layers 2a, 3a on the surface, the solid electrolyte layer 1 and the electrode 2 are bonded with the oxide layer 2a interposed.

In this way, when the electrodes 2, 3 have the oxide layers 2a, 3a, the bond is formed between the solid electrolyte layer 1 and the electrode of the cathode side. The reason this kind of bond is formed is thought to be because when voltage is applied between the solid electrolyte layer 1 and the electrodes 2, 3, between the solid electrolyte layer (X—O) 1 and the oxide layer (R—O) 2a, 3a, a reduction reaction like that shown in formula (1) below occurs.

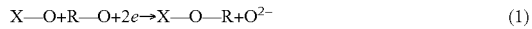

$$X\text{—}O+R\text{—}O+2e \rightarrow X\text{—}O\text{—}R+O^{2-} \quad (1)$$

With the abovementioned reduction reaction, the oxide configuring the oxide layers (R—O) 2a, 3a of the electrodes 2, 3 is reduced, a bond (X—O—R) is formed between the reduced oxide material (R) and the solid electrolyte layer (X—O)1, and the solid electrolyte layer 1 and the electrodes 2, 3 are strongly bonded at the abutting surface. On the other hand, the $O^{2-}$ ions generated with the reduction reaction move in the solid electrolyte layer 1, move to the anode side and are exhausted. In this way, it is thought that a strong bond is formed between the solid electrolyte layer 1 and the electrodes 2, 3 as a result of the reduction reaction occurring in the cathode side electrode.

The reduction reaction represented by formula (1) above is thought to be a contrasting reaction to the electrochemical reaction that occurs with the conventional anode bonding method. Specifically, with the anode bonding method, when bonding the solid electrolyte layer (X—O) 1 and the electrodes (M) 2, 3, between the solid electrolyte layer (X—O) 1 and the electrodes (M) 2, 3, it is believed that the kinds of oxidation reactions shown in formulas (2) to (4) below occur.

$$X\text{—}O+O^{2-}+M \rightarrow X\text{—}O_2M+2e \quad (2)$$

$$O^{2-}+M \rightarrow M\text{-}O+2e \quad (3)$$

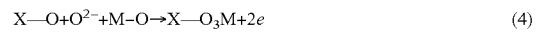

$$X\text{—}O+O^{2-}+M\text{-}O \rightarrow X\text{—}O_3M+2e \quad (4)$$

With the abovementioned oxidation reaction, at the abutting surface of the solid electrolyte layer (R—O) 1 and the electrodes (M) 2, 3, oxygen ions that entered the oxygen vacancy positions discharge electrons, and a strong bond (X—O3–M) is newly formed with the electrodes (M) 2, 3 as well as the solid electrolyte layer (X—O) 1, and a strong bond is formed at the abutting surface.

In this way, bonding based on the reduction reaction at the cathode is a novel bonding method in contrast to conventional anode bonding based on the oxidation reaction at the anode, and is called the "cathode bonding method" with respect to the conventional anode bonding method. With the abovementioned cathode bonding method, it is possible to have strong bonding of the solid electrolyte layer 1 and the electrodes 2, 3 having oxide layers 2a, 3a on the surface with the oxide layers 2a, 3a interposed.

With the cathode bonding method, other than having the oxide layers 2a, 3a on the surface of the electrodes 2, 3, it is possible to apply the requirements relating to the solid electrolyte layer 1 and the electrodes 2, 3 based on the anode bonding method described above as is. Following is an explanation regarding the oxide layers 2a, 3a provided on the surface of the electrodes 2, 3.

The oxide layers 2a, 3a can be, for example, a thermal oxide film formed by implementing a thermal oxidation treatment on the surface of the electrodes 2, 3, or an oxide film formed on the surface of the electrodes 2, 3 using the chemical vapor deposition method (Chemical Vapor Deposition, CVD), or a physical vapor deposition (Physical Vapor deposition, PVD) method. It is also possible to use a natural oxide film formed on the surface of the electrodes 2, 3.

The oxide layers 2a, 3a preferably have electron conductivity. By doing this, it is possible to efficiently reduce the oxide constituting the oxide layers 2a, 3a. As oxide layers 2a, 3a having this kind of electron conductivity, it is possible to configure with an N type oxide semiconductor. Specifically, with the N type oxide semiconductor, the electrons of the N type dopant are excited in a conducting band at a temperature lower than the intrinsic temperature, to have electron conductivity. In light of that, it is preferable to configure the oxide layers 2a, 3a using an N type oxide semiconductor that shows electron conductivity at the temperature during bonding. As the oxide semiconductor doped to an N type in this way, it is possible to use ZnO (Zinc Oxide), ITO (Indium Tin Oxide), TiO (Tin Oxide), etc.

Also, even when the oxide layers 2a, 3a are an insulating film that does not have electron conductivity, by configuring the oxide layers 2a, 3a to be thin to a level at which the electrons can pass through in the thickness direction, it is possible for the oxide layers 2a, 3a to have electron conductivity using a tunnel effect. The specific thickness of the oxide layers 2a, 3a in this case depends on the applied voltage and the characteristics of the oxide material configuring the oxide layers 2a, 3a, so cannot be specified unconditionally. However, if the effective tunnel thickness through which the electrons can pass is approximately 50 Å, it is possible for electrons to pass through in that thickness direction. The stronger the electric field of the film, the thinner the effective tunnel thickness, so the higher the applied voltage, the easier it is for tunnel current to flow. Specifically, when the voltage is extremely low (approximately 1 V), if the thickness of the insulator is approximately 50 Å, the current flows, but at 100 Å it does not flow. However, when the voltage is raised, the electric field of the insulator rises, a phenomenon called Fowler Nordheim Tunneling occurs, and current flows in the insulator. This shows that the effective thickness of the insulator is reduced to the equivalent of 50 Å.

Figure 26:
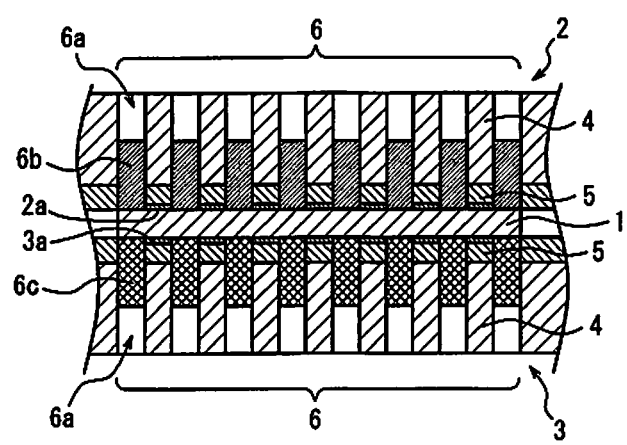
FIG. 26 is a drawing showing a perforated metal having an oxide layer on the surface.

When the electrodes 2, 3 have the perforated metal 6 shown in FIG. 4C, as shown in FIG. 26, the oxide layers 2a, 3a are provided on the surface of the electrode layer 5 that contacts at least the solid electrolyte layer 1 (specifically, the abutting surface with the solid electrolyte layer 1).

In this way, even when the electrodes 2, 3 have the oxide layers 2a, 3a on the surface, according to the flow chart shown in FIG. 1, with two voltage applications, it is possible to bond all the solid electrolyte layers 1 and the electrodes 2, 3.

Even when forming the cell stack for which the fuel cells comprise a plurality of the solid electrolyte layers shown in FIG. 7A and FIG. 7B, other than forming the oxide layer on the surface of the electrodes 2, 3, it is possible to bond all the solid electrolyte layers 1 and the electrodes 2, 3 using the same process, specifically, two voltage applications.

Fuel Cell

The fuel cell according to the present invention is the fuel cell manufactured using the method for manufacturing a fuel cell according to the present invention described above. As described above, the method for manufacturing a fuel cell according to the present invention is characterized by bonding the solid electrolyte layer and the electrodes using the anode bonding method or the cathode bonding method to manufacture the unit cell or the cell stack. The processes of the anode bonding method and the cathode bonding method are processes of lower temperature than that of the wet method, so the obtained fuel cell of the present invention has high durability with respect to repeated heating cycles accompanying starting and stopping.

Embodiment 1

Hereafter, a number of specific examples are explained for the configuration of the cell stack, but the present invention is not limited to these.

First, the method for producing the cell stack using the anode bonding method is explained. A cell stack 30 shown in FIG. 8 comprises solid electrolyte layers 21 and electrodes 22. The electrode 22 has flat plate parts 23, 24 and a standing plate part 25, and with these, the cross section shape of the electrode 22 is configured in a rectangular wave form. The flat plate parts 23, 24 are configured with perforated metal, the flat plate parts 23 functioning as air electrodes, and the flat plate parts 24 functioning as fuel electrodes, contributing to power generation. Also, the standing plate part 25 function as separators separating the solid electrolyte layers 21. Also, the solid electrolyte layer 21 and the flat plate parts 23, 24 placed on the surface configure a bonded body (unit cell), and these unit cells are connected in series in the laminating direction to configure the cell stack 30.

By laminating this kind of rectangular wave form electrode 22 and solid electrolyte layer 21, a flow path of oxidant gas or fuel gas is formed between the solid electrolyte layers 21 and the electrodes 22. In the cell stack 30 shown in FIG. 8, between the opposing electrodes 22 sandwiching the solid electrolyte layers 21, the orientation of the rectangular waves of the cross section shapes of these are parallel to each other, and the phase is matched. Also, the oxidant gas flow paths 26 and the fuel gas flow paths 27 are alternately partitioned in the horizontal direction.

Figure 8:
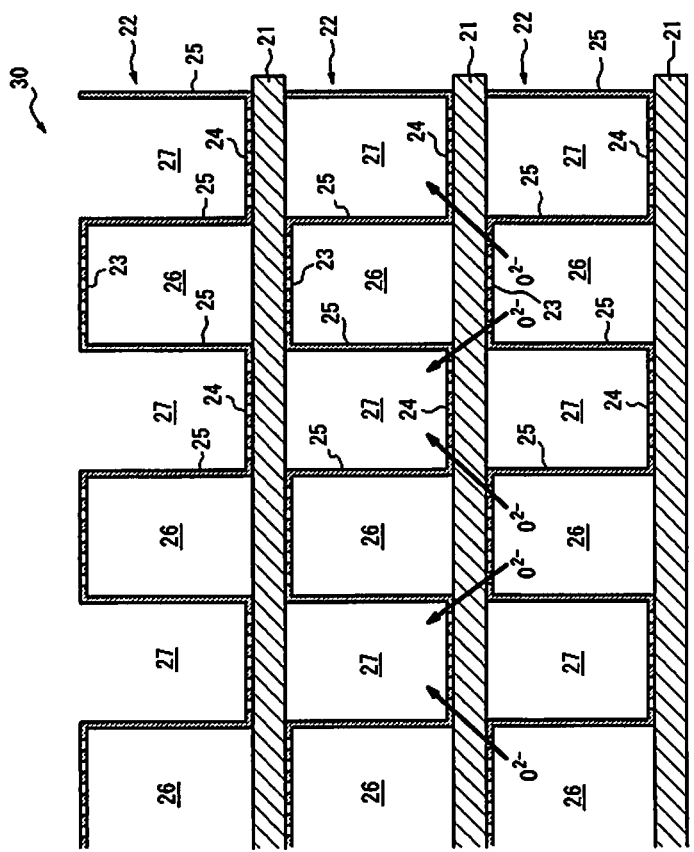
FIG. 8 is a drawing for explaining a cell stack comprising electrodes for which the cross section shape is a rectangular wave form.

The cell stack 30 shown in FIG. 8 is obtained as follows. First, the solid electrolyte layers 21 and the electrodes 22 are laminated as shown in FIG. 8 to make a plurality of laminates. Next, while heating the entirety, voltage of a first polarity is applied between opposing electrodes 22 sandwiching the solid electrolytes 21. Subsequently, a second voltage of the reverse polarity to the first polarity is applied. In this way, the solid electrolyte layers 21 and the electrodes 22 undergo anode bonding, and the cell stack 30 for which the entirety is an integrated unit is obtained.

Here, the operation of the cell stack 30 is explained. First, in the oxidant gas flow paths 26, an oxidant gas such as air, etc., is circulated, and in the fuel gas flow paths 27, a fuel gas such as hydrogen, etc., is circulated. Then, the cell stack 30 is heated using a burner, etc. Having done that, in the flat plate parts (air electrodes) 23, oxygen contained in the oxidant gas receives electrons from an external circuit (not illustrated) and becomes oxygen ions. The generated oxygen ions pass through the solid electrolyte layers 21, move to the diagonally upward fuel gas flow paths 27, and react with the fuel gas. At that time, the electrons are emitted and are supplied to the external circuit. In this way, power generation is performed.

Figure 9:
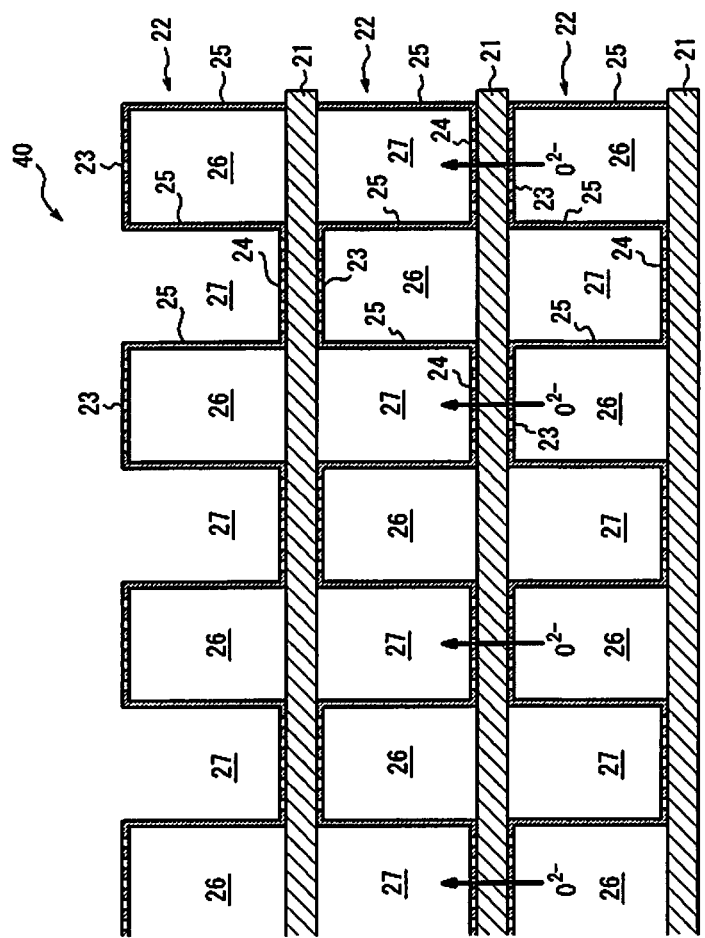
FIG. 9 is a drawing for explaining another cell stack comprising electrodes for which the cross section shape is a rectangular wave form.

FIG. 9 shows a cell stack 40 having a similar structure to that of FIG. 8. In FIG. 9, the same code numbers are given to the same structures in FIG. 8. The difference between the cell stack 40 shown in FIG. 9 and the cell stack 30 shown in FIG. 8 is that in the cell stack 40, the phases of the rectangular waves of the opposing electrodes 22 sandwiching the solid electrolyte layers 21 are mutually reversed to each other. By doing this, the structure is such that the fuel gas flow paths 27 are placed directly above the oxidant gas flow paths 26, and the oxygen ions generated in the flat plate parts (air electrodes) 23 move to the fuel gas flow paths 27 directly above via the solid electrolyte layers 21, and can react with the fuel gas. In this cell stack 40, the movement distance of the ions is short, so the ion conduction resistance is lower than that of the cell stack 30 shown in FIG. 8.

In the cell stack 40, power generation is performed between the opposing flat plate parts 23 and the flat plate parts 24 sandwiching the solid electrolyte layers 21, so the surface area utilization rate of the solid electrolyte layers 21 is approximately 50%.

Figure 10A:
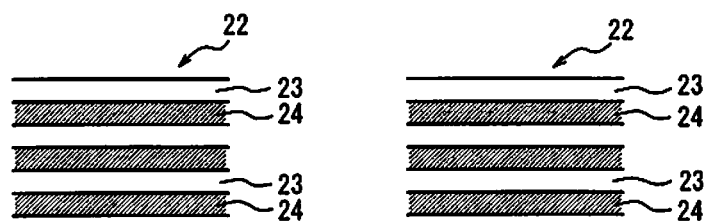
FIG. 10A is a drawing showing a mode of lamination of opposing electrodes.
Figure 10B:
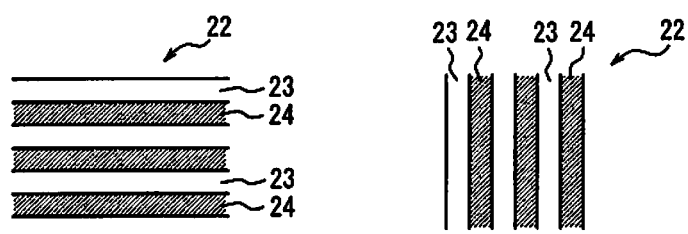
FIG. 10B is a drawing showing a mode of lamination of opposing electrodes.

In the cell stack 30 shown in FIG. 8 and the cell stack 40 shown in FIG. 9, the orientation of the rectangular waves of the cross section shape of the opposing electrodes 22 sandwiching the solid electrolyte layers 21 are parallel to each other as shown in FIG. 10A, but as shown in FIG. 10B, the orientation of the rectangular waves can also be made to cross each other. By doing this, it is possible to place the respective gas introduction ports (not illustrated) from outside not condensed at one location but rather at separate locations, so it is possible to increase the freedom of the layout of the stack overall including gas pipes.

Figure 11:
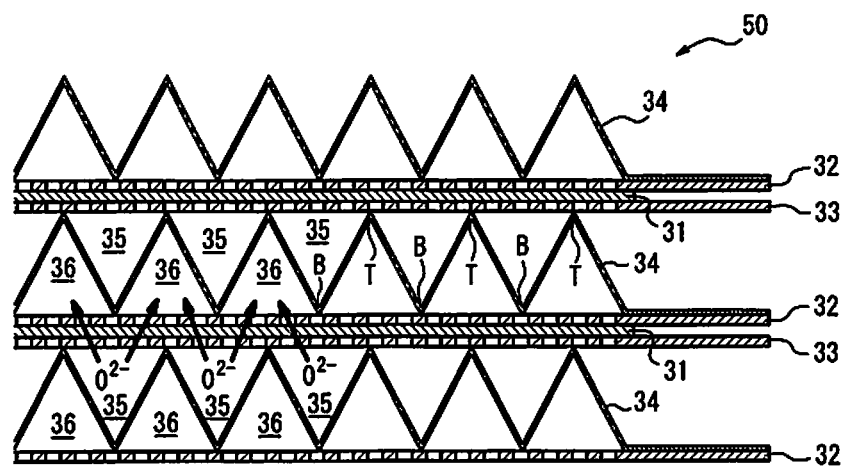
FIG. 11 is a drawing for explaining a cell stack comprising electrodes for which the cross section shape is a triangular wave form.

A cell stack 50 shown in FIG. 11 comprises solid electrolyte layers 31, electrodes 32, 33, and separators 34. The electrodes 32, 33 are configured with perforated metal, and the electrodes 32 function as fuel electrodes while the electrodes 33 function as air electrodes. Also, the separators 34, using press molding for example, are configured to have a cross section shape that is a triangular wave shape. Also, the electrodes 32 are placed at one surface of the solid electrolyte layers 31 and the electrodes 33 are placed at the other surface to configure the bonded bodies (unit cells), and these unit cells are connected in series in the laminating direction to configure the cell stack 50.

By laminating such separators 34 for which the cross section shape is a triangular wave shape with laminates of the solid electrolyte layers 31 and the electrodes 32, 33, flow paths for the oxidant gas or the fuel gas are formed between the solid electrolyte layers 31 and the electrodes 32, 33. In FIG. 11, the orientation of the triangular waves is mutually parallel between the opposing separators 34 sandwiching the laminates, and the phase of the triangular wave is matched. Also, the oxidant gas flow paths 35 and the fuel gas flow paths 36 are alternately partitioned in the horizontal direction.

The cell stack 50 shown in FIG. 11 is obtained as described hereafter. First, the solid electrolyte layers 31, the electrodes 32, 33, and the separators 34 are laminated as shown in FIG. 11 to make a plurality of laminates. Next, while heating the entirety, voltage of a first polarity is applied between opposing electrodes 32, 33 sandwiching the solid electrolyte layers 31. Subsequently, a voltage, being a second voltage of a polarity reverse to the first polarity is applied between the electrodes 32, 33. In this way, the solid electrolyte layers 31 and the electrodes 32, 33 undergo anode bonding. Also, the separators 34 are welded by beam welding, etc., one end with the end of the electrode 32 or 33, so that the entirety is an integrated unit, and the cell stack 50 is obtained.

Here, the operation of the obtained cell stack 50 is explained. First, oxidant gas such as air, etc., is circulated in the oxidant gas flow paths 35, and fuel gas such as hydrogen, etc., is circulated in the fuel gas flow paths 36. Then, the cell stack 50 is heated. Having done that, in the electrodes (air electrodes) 33, the oxygen contained in the oxidant gas receives electrons from an external circuit (not illustrated) to become oxygen ion. The generated oxygen ions pass through the solid electrolyte layer 31 and move to the electrode (fuel electrode) 32, and reacts with the fuel gas. At that time, the electrons are emitted and supplied to an external circuit. In this way, power generation is performed.

In the cell stack 50, because power generation is performed between opposing electrodes 32, 33 sandwiching the solid electrolyte layers 31, the surface area utilization rate of the solid electrolyte layers 31 is approximately 100%.

Figure 12:
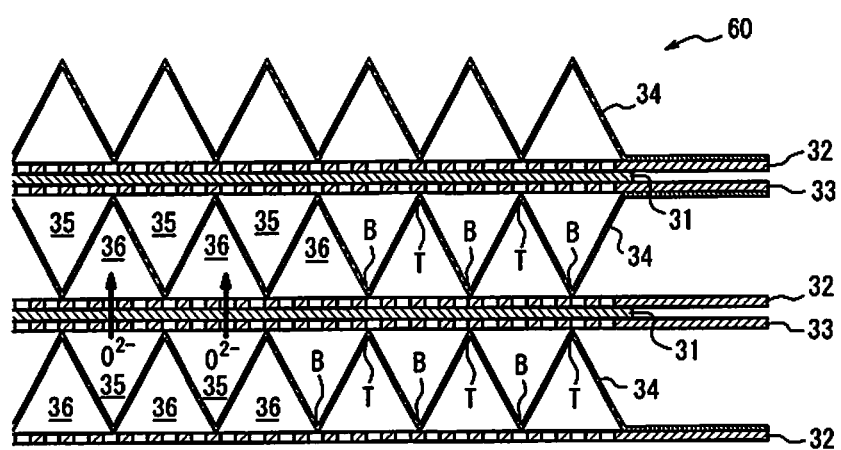
FIG. 12 is a drawing for explaining another cell stack comprising electrodes for which the cross section shape is a triangular wave form.

FIG. 12 shows a cell stack 60 having a similar structure to that of FIG. 11. In FIG. 12, the same code numbers are given to the same structures as FIG. 11. The difference between the cell stack 60 shown in FIG. 12 and the cell stack 50 shown in FIG. 11 is that in the cell stack 60, the phases of the triangular waves of the opposing separators 34 sandwiching the laminates of the solid electrolyte layers 31 and the electrodes 32, 33 are reversed to each other. By doing this, the structure is such that the fuel gas flow paths 36 are placed directly above the oxidant gas flow paths 35, and the oxygen ions generated in the electrodes (air electrodes) 33 move to the fuel gas flow paths 36 directly above via the solid electrolyte layers 31 and can react with the fuel gas. By doing this, in the cell stack 60 shown in FIG. 12, the movement distance of the oxygen ions is short, so the ion conduction resistance is lower than that of the cell stack 50 shown in FIG. 11.

In the abovementioned cell stack 60 as well, power generation is performed between opposing electrodes 32, 33 sandwiching the solid electrolyte layers 31, and the surface area utilization rate of the solid electrolyte layers 31 is approximately 100%.

Figure 13A:
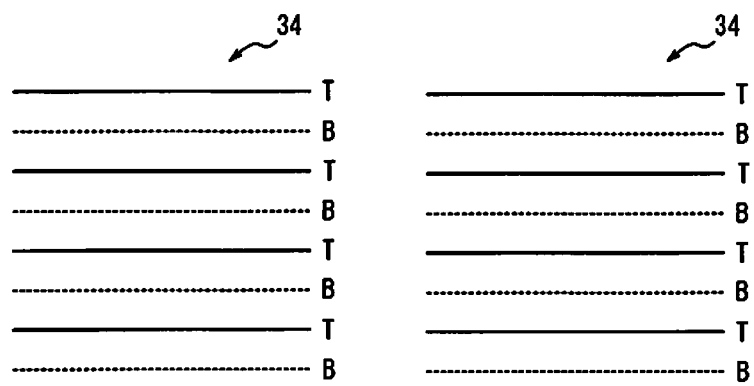
FIG. 13A is a drawing for explaining a mode of lamination of opposing electrodes.
Figure 13B:
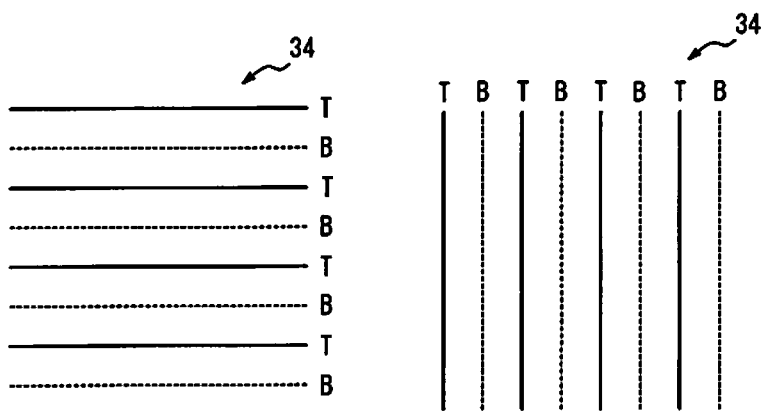
FIG. 13B is a drawing for explaining a mode of lamination of opposing electrodes.

In the cell stack 50 shown in FIG. 11 and the cell stack 60 shown in FIG. 12, the orientation of the triangular waves of the cross section shape of the opposing separators 34 sandwiching the solid electrolyte layers 31 and the electrodes 32, 33 are parallel to each other as shown in FIG. 13A, but as shown in FIG. 13B, it is also possible to have the orientation of the triangular waves cross each other according to the circumstances of the layout of the gas pipe placement. The stacks shown in FIGS. 8 to 13 have the cells formed in a serially connected structure. The output of the unit cell is approximately 1 V, but it is possible to obtain a high voltage by overlapping unit cells serially in this way.

Figure 14:
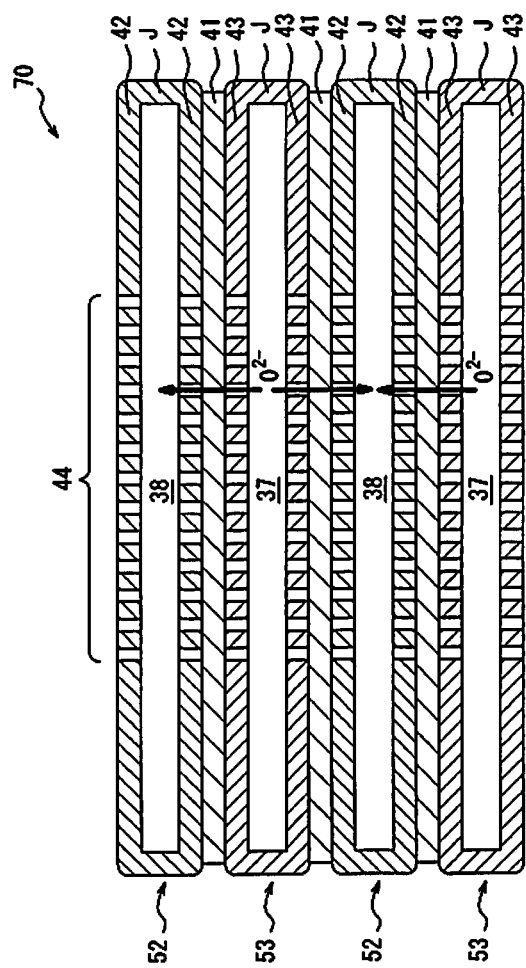
FIG. 14 is a drawing for explaining a cell stack comprising electrode bodies for which two electrodes are bonded.

A cell stack 70 shown in FIG. 14 is an embodiment of the invention suited to a case when wanting to make the power generating capacity larger. The cell stack 70 comprises solid electrolyte layers 41 and electrode bodies 52, 53, where with the electrode bodies 52, two electrodes 42 having a perforated metal 44 are bonded at the peripheral edge part with a designated interval opened, and these function as fuel electrodes. Also, between the two electrodes 42 in the electrode bodies 52, fuel gas flow path 38 are partitioned. Similarly, with the electrode bodies 53, the two electrodes 42 having the perforated metal 44 are bonded at the peripheral edge part with a designated interval opened, and these function as air electrodes. Also, between the two electrodes 43 in the electrode bodies 53, the oxidant gas flow paths 37 are partitioned. Then, the electrodes 42 are placed at one surface of the solid electrolyte layers 41 and the electrodes 43 are placed at the other surface to configure the unit cells, and the unit cells are laminated to configure the cell stack 70. Also, bonding parts J at the electrode bodies 52 and 53 function as the separators of the unit cells. The respective electrodes 42 and 43 are respectively consolidated in a common extraction electrode (not illustrated) to configure a parallel connection. By configuring in this way, though the voltage is low, it is possible to obtain a cell stack that is compact with high capacity.

The cell stack 70 shown in FIG. 14 is obtained as described hereafter. First, two electrodes 42 are placed with a designated interval opened, the peripheral edge parts thereof are welded using beam welding, etc., and these are used as electrode bodies 52. A plurality of these electrode bodies 52 are prepared. Similarly, the peripheral edge parts of two electrodes 43 are welded to prepare a plurality of electrode bodies 53. Next, the solid electrolyte layers 41 and the electrode bodies 52, 53 are laminated as shown in FIG. 14. Subsequently, while heating the entirety, voltage of a first polarity is applied between opposing electrode bodies 52, 53 sandwiching the solid electrolyte layers 41. Subsequently, between the electrode bodies 52, 53, a voltage of a second polarity that is the reverse polarity to the first polarity is applied. In this way, the solid electrolytes 41 and the electrode bodies 52, 53 undergo anode bonding, the entirety is made to be an integrated unit, and the cell stack 70 is obtained.

Here, the operation of the obtained cell stack 70 is explained. First, oxidant gas such as air, etc., is circulated in oxidant gas flow paths 37, and fuel gas such as hydrogen, etc., is circulated in fuel gas flow paths 38. Then, the cell stack 70 is heated using a burner, etc. Having done that, in the electrode bodies (air electrodes) 53, the oxygen contained in the oxidant gas receives electrons from an external circuit (not illustrated) and becomes oxygen ions. The generated oxygen ions pass through the solid electrolyte layers 41 and move to the electrode bodies (fuel electrodes) 52, and react with the fuel gas. At that time, the electrons are emitted and supplied to the external circuit. In this way, power generation is performed.

Figure 15:
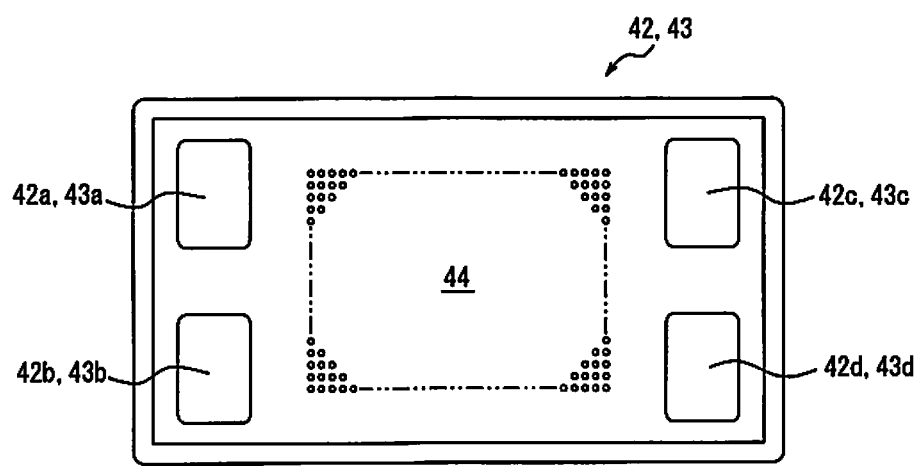
FIG. 15 is a drawing for explaining four gas circulation ports provided in the electrode.

Following, using the cell stack 70 as an example, a more detailed explanation is given of the manufacturing steps of the cell stack. FIG. 15 shows a more detailed configuration of the electrodes 42, 43. In the electrode 42 shown in this drawing, gas circulation ports 42a to 42d are provided at the four corners. Similarly, in the electrode 43, gas circulation ports 43a to 43d are provided at the four corners.

Figure 16A:
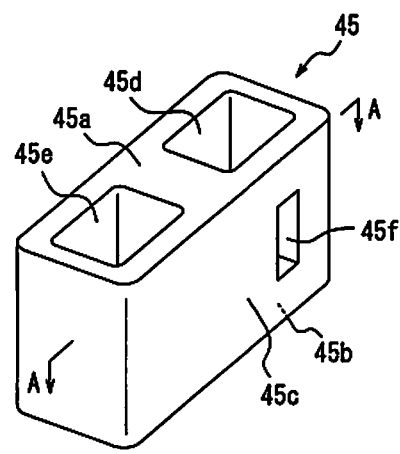
FIG. 16A is a perspective view of the structure of a separator.
Figure 16B:
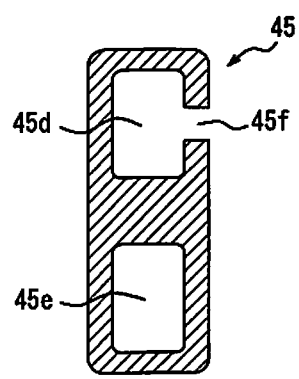
FIG. 16B is a cross section view of the structure of the separator.

FIG. 16A and FIG. 16B show the separator placed between two electrodes 42 (43), with FIG. 16A showing a perspective view and FIG. 16B showing a cross section view. The separator 45 shown in FIG. 16A and FIG. 16B has a top surface 45a, a bottom surface 45b, and a side surface 45c, and two through holes 45d, 45e that pass through the top surface 45a and the bottom surface 45b. Also, the separator 45 has an opening 45f that communicates with one or the other of the two through holes (in the drawing, the through hole 45d) in the side surface 45c.

Figure 17A:
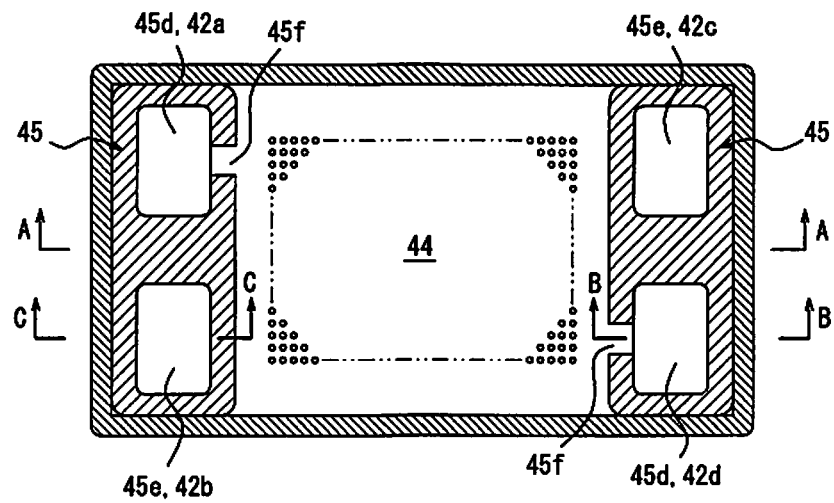
FIG. 17A is a drawing for explaining the placement of separators between two electrodes.
Figure 17B:
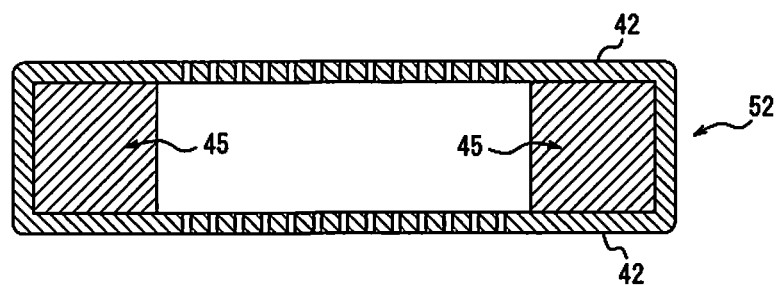
FIG. 17B is a drawing for explaining the placement of separators between two electrodes.
Figure 17C:
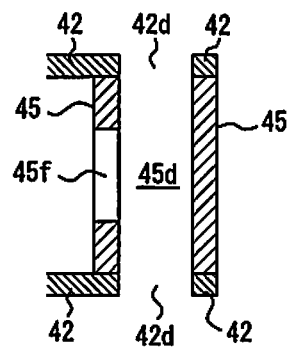
FIG. 17C is a cross section view of B-B in FIG. 17A.
Figure 17D:
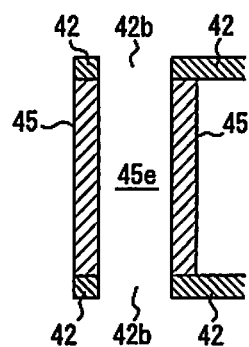
FIG. 17D is a cross section view of C-C in FIG. 17A.

As shown in FIG. 17A and FIG. 17B, two separators 45 are placed between two electrodes 42 (43) (specifically, between laminates). At that time, as shown by the B-B cross section view of FIG. 17A shown in FIG. 17C, and the C-C cross section view of FIG. 17A shown in FIG. 17D, the two separators 45 are placed such that: (i) adjacent gas circulation ports (42d in the drawing) are in communication with each other via the through hole 45d of the separator 45, (ii) the openings 45f are placed so as to face each other, and (iii) separators 45 adjacent in the laminating direction of the laminates are vertically inverted to each other.

Figure 18:
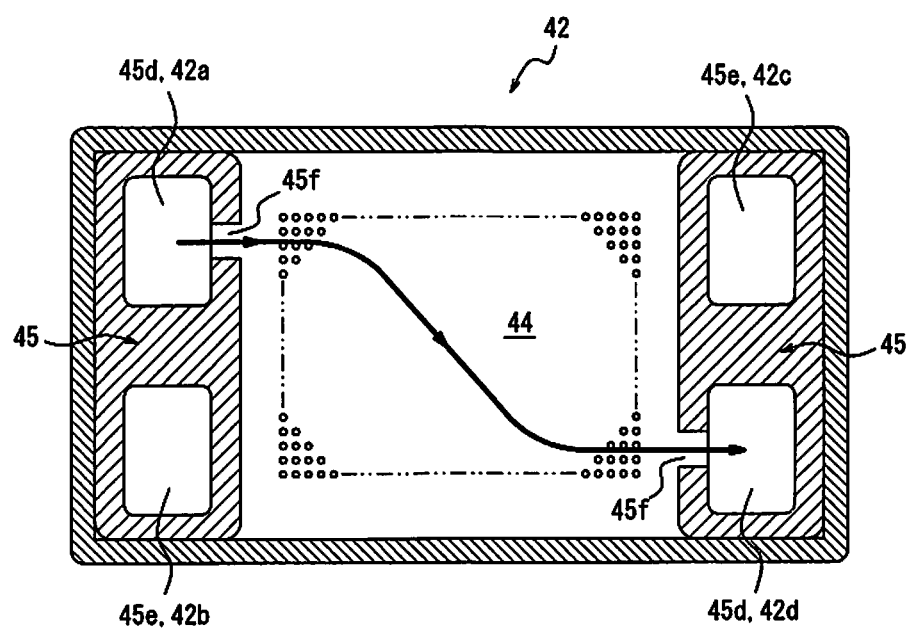
FIG. 18 is a drawing for explaining the flow of gas in a gas flow path.

With the abovementioned requirement (ii), as shown in FIG. 17A, the through holes 45d in communication with the openings 45f are made to exist at positions diagonal to each other on the electrodes 42. By doing this, the oxidant gas or the fuel gas introduced from the openings 45f is circulated in the diagonal line direction on the electrodes 42 (43) as shown in FIG. 18, so it is possible to increase the amount of gas that contacts the electrodes 42 (43), and possible to improve the power generating efficiency. Also, with the abovementioned requirement (iii), with the electrode bodies 52, 53 adjacent in the laminating direction, it is possible to have different gases pass through the interiors.

Figure 19A:
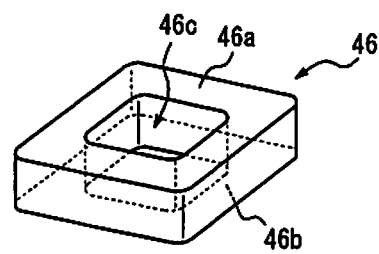
FIG. 19A is a drawing for explaining a gasket.
Figure 19B:
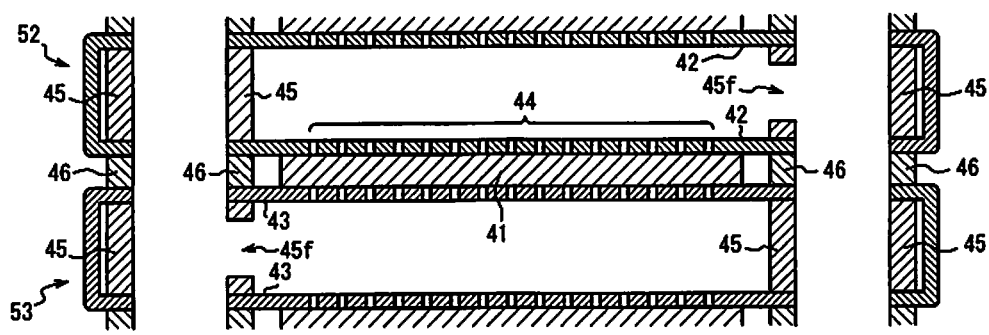
FIG. 19B is a drawing for explaining the placement of the gasket of FIG. 19A.

FIG. 19A shows a gasket placed between opposing electrodes 42, 43 sandwiching the solid electrolyte layer 41. The gasket 46 shown in this drawing has a top surface 46a and a bottom surface 46b, and has a through hole 46c that passes through the top surface 46a and the bottom surface 46b. The gasket 46 later seals between the gas introduction pipe inserted in the through hole 46c and the gas circulation ports 42a to 42d. As shown in FIG. 19B, this gasket 46 is placed so that between all of the electrode bodies 52 and the electrode bodies 53, the gas circulation ports 42a, 42b, 42c, and 42d adjacent in the laminating direction are made to be in communication with each other via the through hole 46c of the gasket.

Figure 20A:
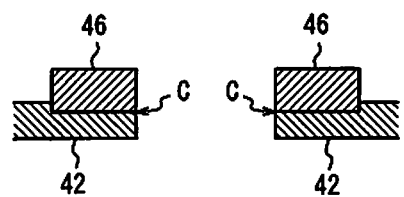
FIG. 20A is a drawing for explaining the method for suppressing expansion of the through hole of the gasket.

When the gasket 46 is heated to the temperature during power generation, thermal expansion occurs and the through hole 46c expands, the gasket 46 separates from the gas introduction pipe, and there is the risk that the seal between the gas introduction pipe and the gas circulation ports 42a to 42d will be imperfect. In light of that, as shown in FIG. 20A, by providing a recess C in the electrode 42, and placing the gasket 46 in the recess C, it is possible to prevent expansion of the through hole 46c.

Figure 20B:
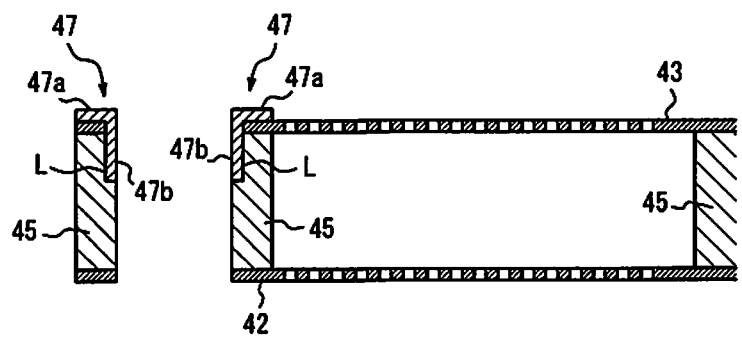
FIG. 20B is a drawing for explaining another method for suppressing expansion of the through hole of the gasket.

Alternatively, as shown in FIG. 20B, a gasket 47 is prepared having a ring shaped base 47a and a tube shaped convex part 47b, and it is possible to configure this such that a diameter expansion part L is provided in the separator 45, and the tube shaped convex part 47b of the gasket 47 is inserted in this diameter expansion part L.

Figure 21A:
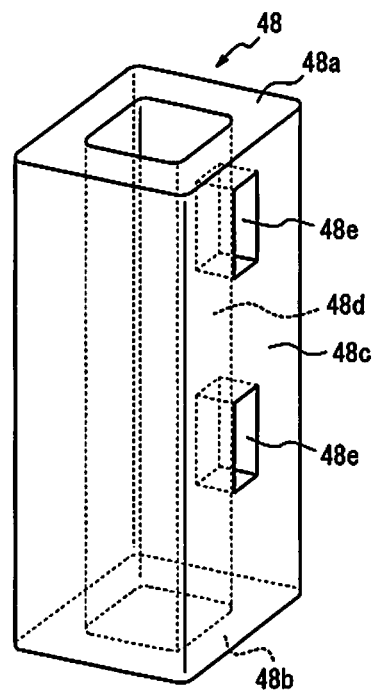
FIG. 21A is a drawing showing a gas supply pipe.
Figure 21B:
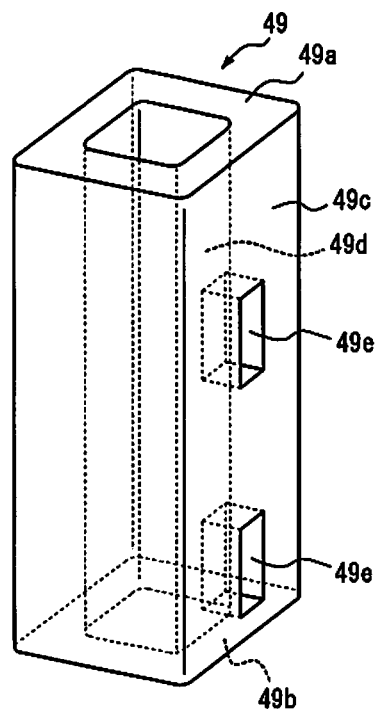
FIG. 21B is a drawing showing a gas supply pipe.

FIG. 21A and FIG. 21B show two types of gas introduction pipes conducted to the gas circulation ports 42a to 42d of the electrode 42. A gas introduction pipe 48 shown in FIG. 21A has a top surface 48a, a bottom surface 48b, an outer surface 48c, and an inner surface 48d, and has an opening 48e that passes through the outer surface 48c and the inner surface 48d. Also, the gas introduction pipe 49 shown in FIG. 21B has a top surface 49a, a bottom surface 49b, an outer surface 49c, and an inner surface 49d, and has an opening 49e that passes through the outer surface 49c and the inner surface 49d.

The gas introduction pipe 48 shown in FIG. 21A and the gas introduction pipe 49 shown in FIG. 21B have different positions in the axial direction of the openings, with one pipe used to introduce fuel gas, and the other pipe used to introduce oxidant gas, using two each.

The gas introduction pipes 48, 49 are inserted in gas circulation ports 42a to 42d of the electrode 42 and the gas circulation ports 43a to 43d of the electrode 43, via through holes 45d, 45e of the separator 45 and the through hole 46c of the gasket 46, and such that the openings 48e, 49e of the gas introduction pipes 48, 49 and the opening 45f of the separator 45 overlap.

Figure 22:
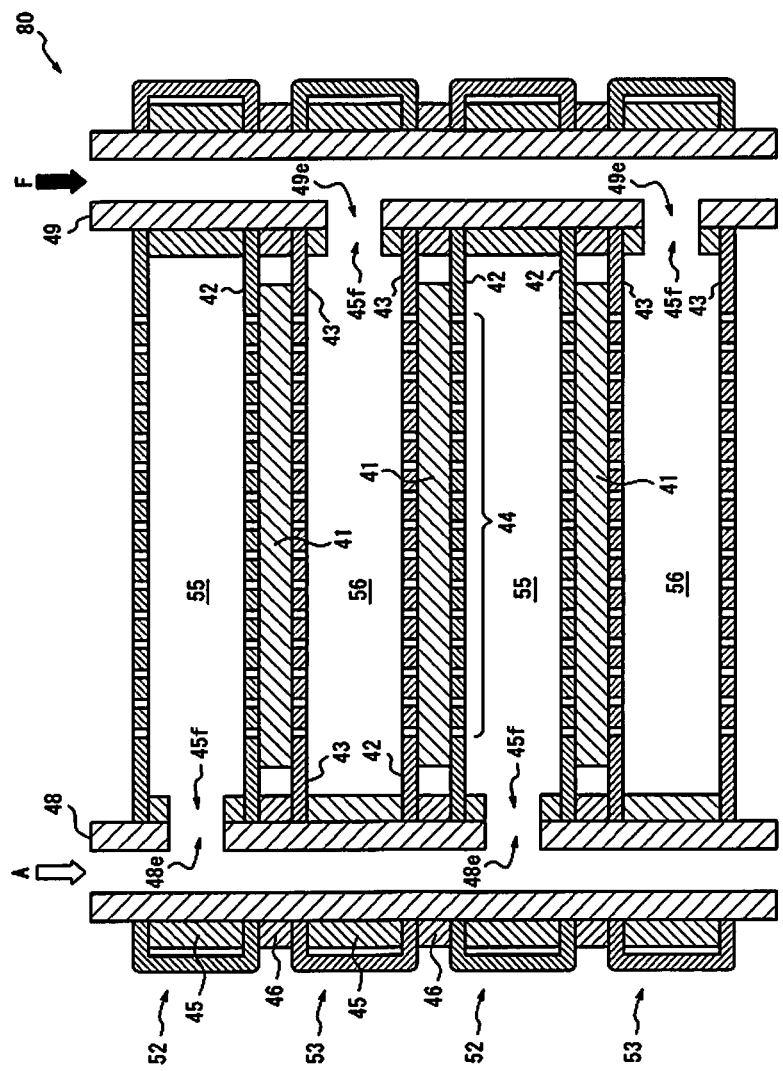
FIG. 22 is a drawing showing the cell stack in which the gas supply pipe is inserted.

FIG. 22 shows a cell stack 80 obtained after inserting the gas introduction pipes 48, 49 in gas circulation ports 42a to 42d of the electrode 42 and gas circulation ports 43a to 43d of the electrode 43. As described above, with the gas introduction pipes 48 and 49, the positions in the axial direction of the openings 48e, 49e are different, and the openings 48e, 49e are connected to respectively different gas flow paths. In the cell stack 80 shown in FIG. 22, the oxidant gas A is introduced from the gas introduction pipe 48, and the fuel gas F is introduced from the gas introduction pipe 49.

The oxidant gas A introduced from the gas introduction pipe 48 passes through an oxidant gas flow path 55, and in the electrode (air electrode) 42, the oxygen contained in the oxidant gas A receives electrons from an external circuit (not illustrated) and becomes oxygen ions. These oxygen ions pass through the solid electrolyte layer 41, and move to the electrode (fuel electrode) 43. The oxidant off-gas after reaction is exhausted to outside of the cell stack 80 from the opening 48e of one more gas introduction pipe 48 that is not illustrated.

Meanwhile, the fuel gas F introduced from the gas introduction pipe 49 passes through a fuel gas flow path 56, and in the electrode (fuel electrode) 43, the oxygen ions that passed through the solid electrolyte layer 41 react with the fuel gas F. At that time, electrons are emitted and supplied to an external circuit. In this way, power generation is performed. The fuel off-gas after reaction is exhausted to outside of the cell stack 80 from the opening 49e of one more gas introduction pipe 49 that is not illustrated.

With the cell stack 80 obtained as described above, as shown in FIG. 23, by being sandwiched by two end plates

61, passing a bolt 62 through the end plates 61, and tightening and fixing using a nut 63, ultimately, a cell stack 200 is obtained.

Figure 24:
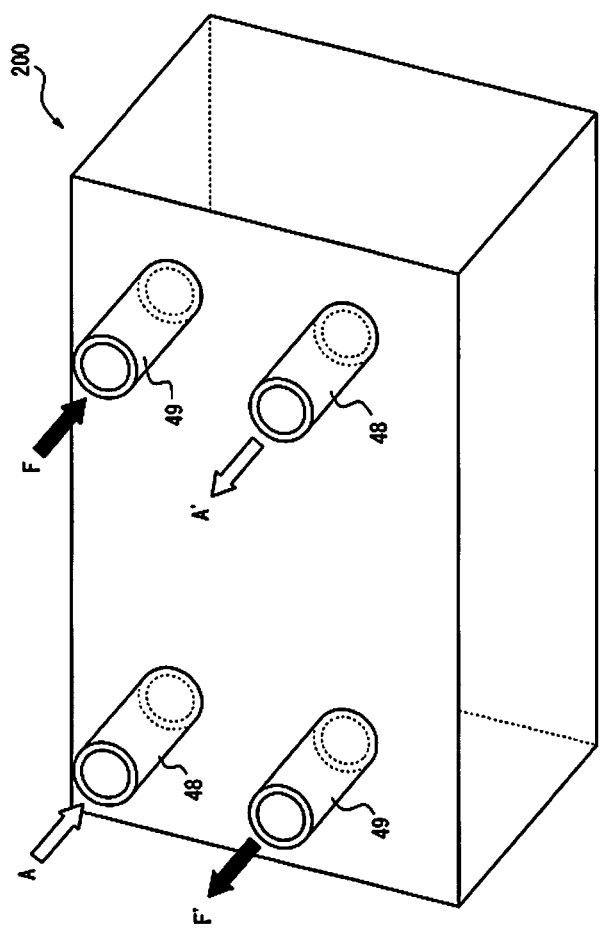
FIG. 24 is a drawing showing the flow of gas in the cell stack.

FIG. 24 shows the flow of gas in the obtained cell stack 200. As shown in this drawing, the oxidant gas A obtained from one of the gas introduction pipes 48 goes via an opening of the gas introduction pipe 48 that is not illustrated and passes through the oxidant gas flow path inside the cell stack 200, and the oxidant off-gas A' is exhausted from the other gas introduction pipe 48. Also, the fuel gas F introduced from one of the gas introduction pipes 49 passes through the fuel gas flow path inside the cell stack 200, and the fuel off-gas F' is exhausted from the other gas introduction pipe 49.

Embodiment 2

Figure 27:
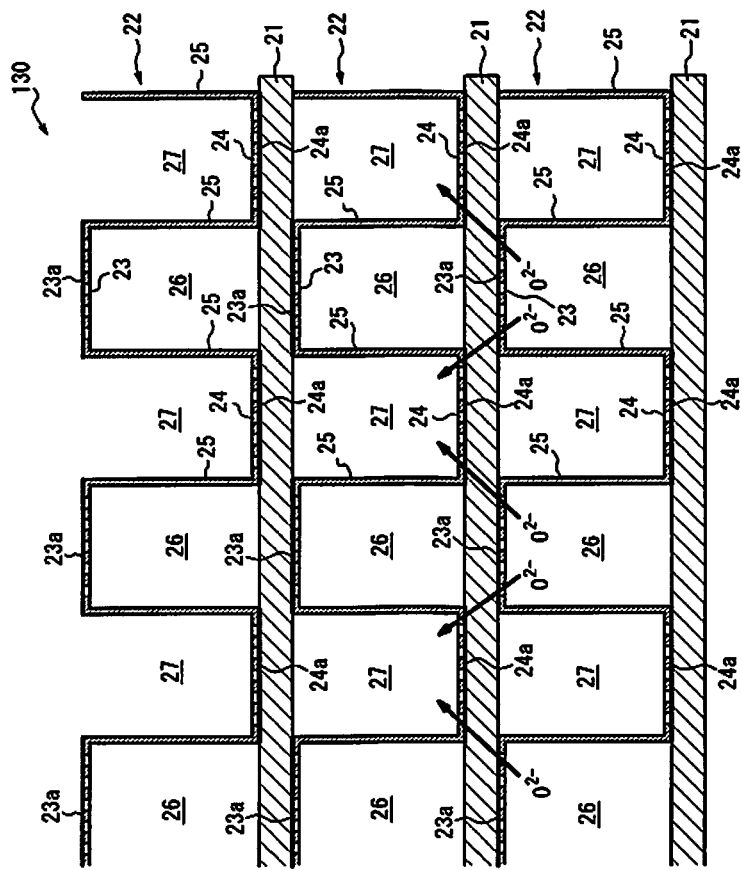
FIG. 27 is a drawing for explaining a cell stack 130 that is similar to a cell stack 30 shown in FIG. 8, formed using the cathode bonding method.

Next, the method of producing the cell stack using the cathode bonding method is explained. FIG. 27 shows a cell stack 130 having a similar structure to the cell stack 30 shown in FIG. 8. In FIG. 27, the same code numbers are given to the same structures as those of FIG. 8, and an explanation is omitted. The difference between the cell stack 130 shown in FIG. 27 and the cell stack 30 shown in FIG. 8 is that in the cell stack 130, of the surfaces of the flat plate parts 23, 24 of the electrodes 22, oxide layers 23a, 24a are provided at the portions contacting the solid electrolyte layers 21. By doing this, using the cathode bonding method described above, by doing two voltage application steps, it is possible to obtain the cell stack 130.

In specific terms, first, using thermal oxidation treatment, etc., of the surfaces of the flat plate parts 23, 24 of the electrodes 22, oxide layers 23a, 24a are formed at the portions that contact the solid electrolyte layers 21. Next, as shown in FIG. 27, the solid electrolyte layers 21 and the electrodes 22 are laminated to make a plurality of laminates. While heating the entirety of the plurality of laminates obtained in this way, a voltage of a first polarity is applied between opposing electrodes 22 sandwiching the solid electrolyte layers 21. Subsequently, a second voltage of a polarity that is the reverse of the first polarity is applied. In this way, the solid electrolyte layers 21 and the electrodes 22 undergo cathode bonding with the oxide layers 23a, 24a interposed, the entirety is made to be an integrated unit, and the cell stack 130 is obtained. The operation of the cell stack 130 is the same as that of the cell stack 30 shown in FIG. 8, so an explanation is omitted.

Figure 28:
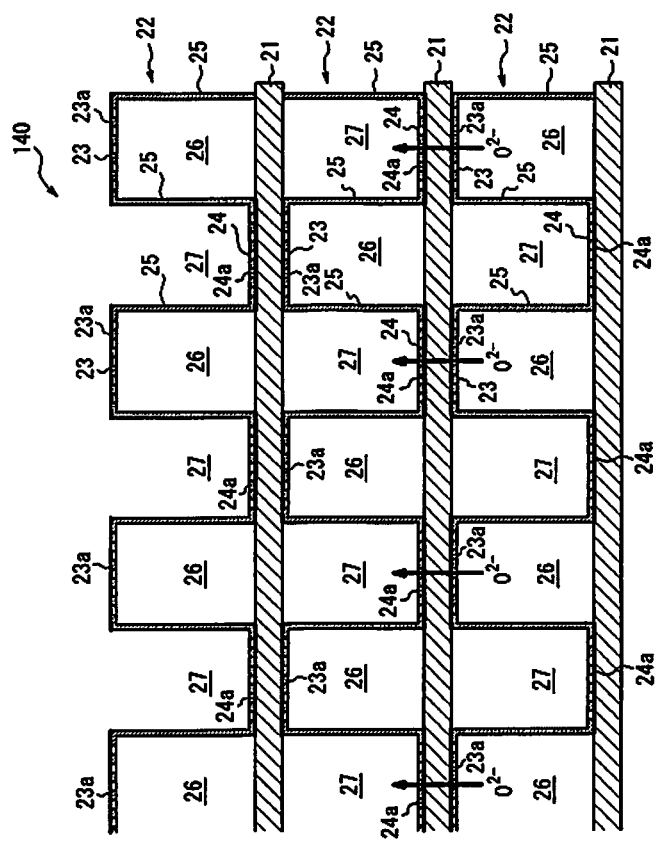
FIG. 28 is a drawing for explaining a cell stack 140 that is similar to the cell stack 130 shown in FIG. 27, formed using the cathode bonding method.

FIG. 28 shows a cell stack 140 having a similar structure to the cell stack 130 shown in FIG. 27. In FIG. 28, the same code numbers are given to the same structures as FIG. 27. The difference between the cell stack 140 shown in FIG. 28 and the cell stack 130 shown in FIG. 27 is that in the cell stack 140, the phases of the rectangular waves of the opposing electrodes 22 sandwiching the solid electrolyte layers 21 are reversed. By doing this, the configuration is such that the fuel gas flow paths 27 are placed directly above the oxidant gas flow paths 26, and the oxygen ions generated in the flat plate parts (air electrodes) 23 move to the fuel gas flow paths 27 directly above via the solid electrolyte layers 21, and can react with the fuel gas. In this cell stack 140, the movement distance of the oxygen ions is short, so the ion conducting resistance is lower than that of the cell stack 130 shown in FIG. 27.

In the cell stack 140, power generation is performed between the opposing flat plate parts 23 and the flat plate parts 24 sandwiching the solid electrolyte layers 21, so the surface area utilization rate of the solid electrolyte layers 21 is approximately 50%.

In the cell stack 130 shown in FIG. 27 and the cell stack 140 shown in FIG. 28 as well, the orientation of the rectangular waves of the cross section shape of the opposing electrodes 22 sandwiching the solid electrolyte layers 121 are mutually parallel as shown in FIG. 10A, but it is also possible to have the orientation of the rectangular waves cross each other as shown in FIG. 10B. By doing this, the respective gas introduction ports from outside (not illustrated) can be placed at separate locations without being condensed at one location, so it is possible to improved the degree of freedom of the layout of the stack overall including the gas pipes.

Figure 29:
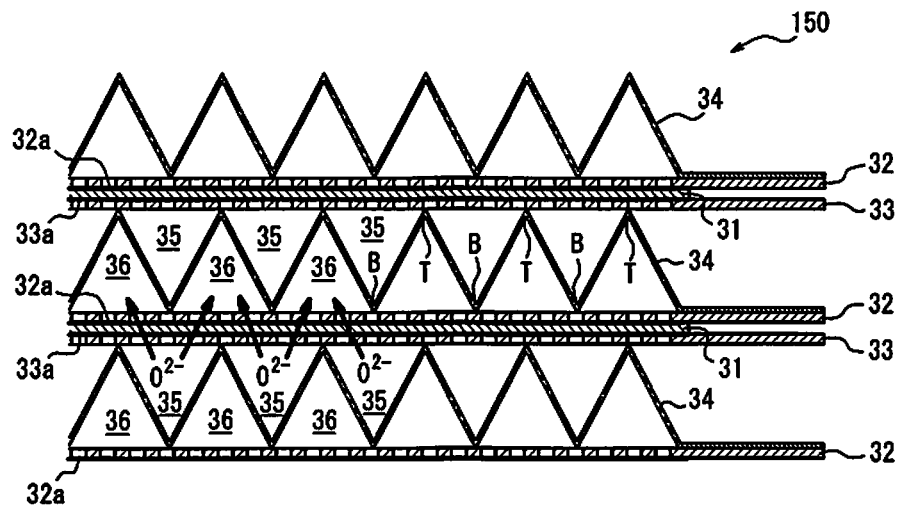
FIG. 29 is a drawing for explaining a cell stack 150 that is similar to a cell stack 50 shown in FIG. 11, formed using the cathode bonding method.

FIG. 29 shows a cell stack 150 having a similar structure to the cell stack 50 shown in FIG. 11. In FIG. 29, the same code numbers are given for the same structures as in FIG. 11, and an explanation is omitted. The difference between the cell stack 150 shown in FIG. 29 and the cell stack 50 shown in FIG. 11 is that in the cell stack 150, of the surfaces of the electrodes 32, 33, oxide layers 32a, 33a are provided on the portions in contact with the solid electrolyte layers 31. By doing this, using the cathode bonding method described above, by doing two voltage application steps, it is possible to obtain the cell stack 150.

In specific terms, first, using thermal oxidation treatment, etc., of the surfaces of the electrodes 32, 33, oxide layers 32a, 33a are formed on the portions in contact with the solid electrolyte layers 31. Next, the solid electrolyte layers 31, the electrodes 32, 33, and the separators 34 are laminated to make a plurality of laminates as shown in FIG. 29. While heating the entirety of the plurality of laminates obtained in this way, voltage of a first polarity is applied between opposing electrodes 32, 33 sandwiching the solid electrolyte layers 31. Subsequently, a voltage, being a second voltage of the reverse polarity to the first polarity, is applied between the electrodes 32, 33. In this way, the solid electrolyte layers 31 and the electrodes 32, 33 undergo cathode bonding with the oxide layers 32a, 33a interposed. Also, with the separators 34, by the end parts being welded using beam welding, etc., to the end parts of the electrodes 32 or 33, the entirety is made to be an integrated unit, and the cell stack 150 is obtained. The operation of the cell stack 150 is the same as that of the cell stack 50 shown in FIG. 11, so an explanation is omitted.

In the cell stack 150, power generation is performed between opposing electrodes 32, 33 sandwiching the solid electrolyte layers 31, so the surface area utilization rate of the solid electrolyte layers 31 is approximately 100%.

Figure 30:
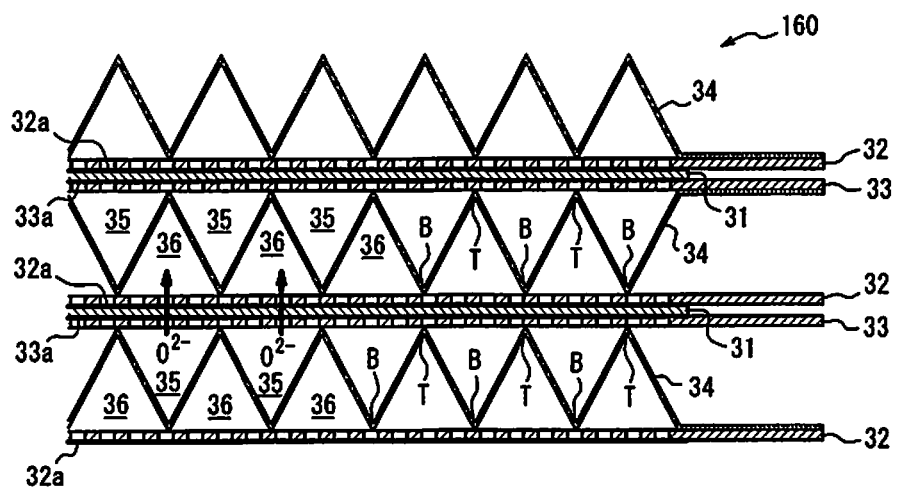
FIG. 30 is a drawing for explaining a cell stack 160 that is similar to the cell stack 150 shown in FIG. 29, formed using the cathode bonding method.

FIG. 30 shows a cell stack 160 having a similar structure to that of the cell stack 150 shown in FIG. 29. In FIG. 30, the same code numbers are given to the same structures as in FIG. 29. The difference between the cell stack 160 shown in FIG. 30 and the cell stack 150 shown in FIG. 29 is that in the cell stack 160, the phases of the triangular waves of opposing separators 34 sandwiching the laminates of the solid electrolyte layers 31 and the electrodes 32, 33 are reversed to each other. By doing this, the structure is such that the fuel gas flow paths 36 are placed directly above the oxidant gas flow paths 35, and the oxygen ions generated in the electrodes (air electrodes) 33 move to the fuel gas flow paths 36 directly above via the electrolyte layers 31 and are able to react with the fuel gas. By doing this, in the cell stack 160 shown in FIG. 30, the movement distance of the oxygen ions is short, so the ion conducting resistance is lower than that of the cell stack 150 shown in FIG. 29.

In the cell stack 160 as well, power generation is performed between opposing electrodes 32, 33 sandwiching the solid electrolytes 31, and the surface area utilization rate of the solid electrolyte layers 31 is approximately 100%.

In the cell stack 150 shown in FIG. 29 and the cell stack 160 shown in FIG. 30, the orientations of the triangular waves of the cross section shape of opposing separators 134 sandwiching laminates of the solid electrolyte layers 31 and the electrodes 32, 33 are parallel to each other as shown in FIG. 13A, but as shown in FIG. 13B, it is also possible to have the orientations of the triangular waves cross each other according to the circumstances of the layout of the gas pipe placement.

Figure 31:
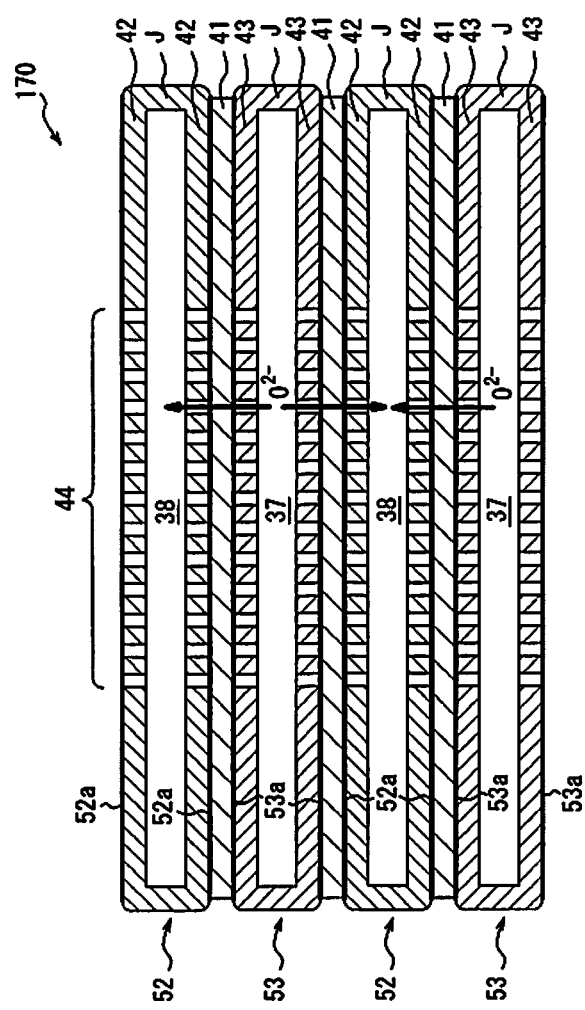
FIG. 31 is a drawing for explaining a cell stack 170 that is similar to a cell stack 70 shown in FIG. 14, formed using the cathode bonding method.

FIG. 31 shows a cell stack 170 having a similar structure to that of the cell stack 70 shown in FIG. 14. In FIG. 31, the same code numbers are given to the same structures as in FIG. 14, and an explanation is omitted. The difference between the cell stack 170 shown in FIG. 31 and the cell stack 70 shown in FIG. 14 is that in the cell stack 170, of the surfaces of the electrode bodies 52, 53, oxide layers 52a, 53a are provided on the portions in contact with the solid electrolyte layers 41. By doing this, using the cathode bonding method described above, by doing two voltage application steps, it is possible to obtain the cell stack 170.

In specific terms, first, two electrodes 42 are placed with a designated interval opened, their peripheral edge parts are welded using beam welding, etc., and these are used as the electrode bodies 52. A plurality of these electrode bodies 52 are prepared. Similarly, a plurality of electrode bodies 53 are prepared for which the peripheral edge parts of two electrodes 43 are welded. Next, of the surfaces of the electrode bodies 52, 53, oxide layers 52a, 53a are formed at the portions in contact with the solid electrolyte layers 41. Subsequently, the solid electrolyte layers 41 and the electrode bodies 52, 53 are laminated as shown in FIG. 31 to make a plurality of laminates. While heating the entirety of the plurality of laminates obtained in this way, voltage of a first polarity is applied between opposing electrode bodies 52, 53 sandwiching the solid electrolyte layers 41. Subsequently, between the electrode bodies 52, 53, a second voltage of the reverse polarity to the first polarity is applied. In this way, the solid electrolyte layers 41 and the electrode bodies 52, 53 undergo cathode bonding with the oxide layers 52a, 53a interposed, the entirety is made to be an integrated unit, and the cell stack 170 is obtained. The operation of the cell stack 170 is the same as that of the cell stack 70 shown in FIG. 14, so an explanation is omitted.

Figure 32:
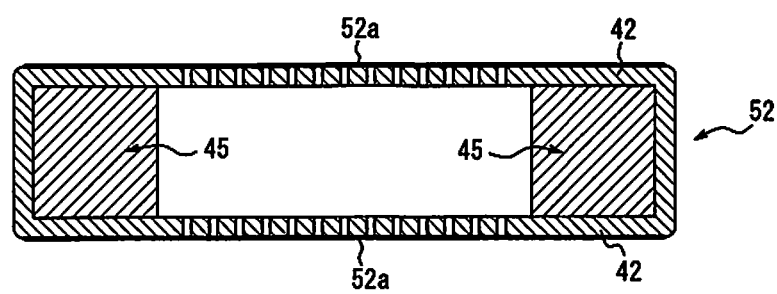
FIG. 32 is a drawing showing an electrode body for which an oxide layer is formed on the surface.

Hereafter, using the cell stack 170 as an example, a more detailed example is given of the manufacturing steps of the cell stack. First, the electrodes 42 (43) shown in FIG. 15 and the separator 45 shown in FIG. 16 is prepared, and the separator 45 is placed as shown in FIG. 17A. Next, the peripheral edge parts of the electrodes 42 (43) are welded using beam welding, etc., and the electrode body 52 like that shown in FIG. 17B is formed. Subsequently, as shown in FIG. 32, the oxide layer 52a (53a) is formed on the surface of the electrode body 52 (53).

Figure 33:
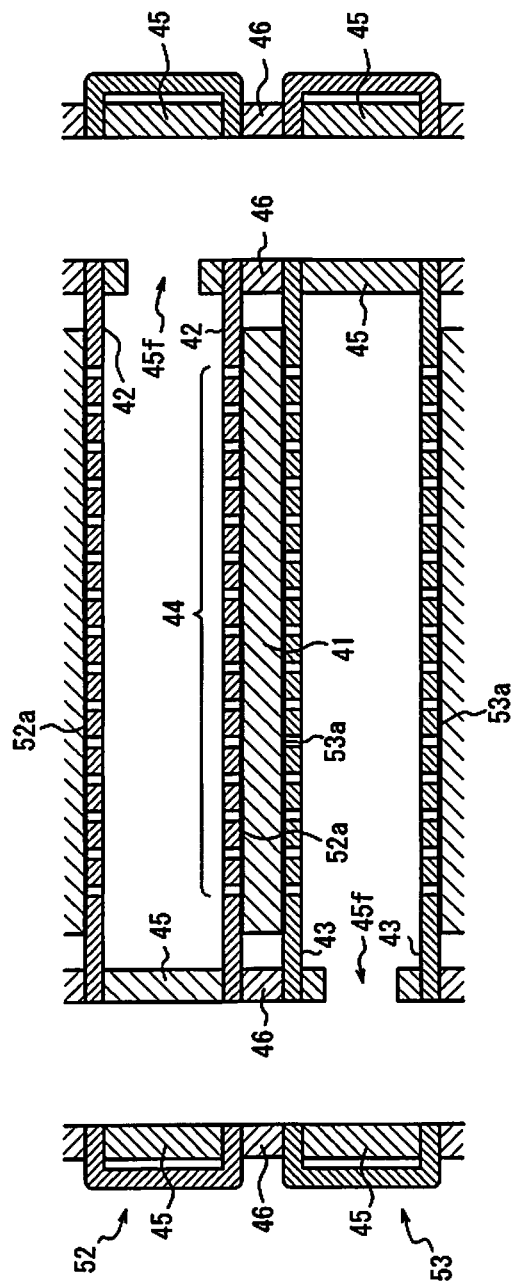
FIG. 33 is a drawing showing the state of electrode bodies having a solid electrolyte layer and an oxide layer being laminated with a gasket interposed.

Next, the electrode bodies 52 (53) obtained as described above, the solid electrolyte layer 41, and the gasket 46 shown in FIG. 19A are placed as shown in FIG. 33. Here, with the gasket 46, between all the electrode bodies 52 and the electrode bodies 53, gas circulation ports 42a, 42b, 42c, and 42d adjacent in the laminating direction are placed so as to be in communication with each other via the through hole 46c of the gasket. The oxide layers 52a, 53a are provided on the portion that is in contact with the solid electrolyte layer 41.

Subsequently, the two types of gas introduction pipes 48, 49 shown in FIG. 21 are inserted in gas circulation ports 42a to 42d of the electrode 42 and gas circulation ports 43a to 43d of the electrode 43 via through holes 45d, 45e of the separator 45 and the through hole 46c of the gasket 46, and such that the openings 48e, 49e of the gas introduction pipes 48, 49 and the opening 45f of the separator 45 overlap.

Figure 34:
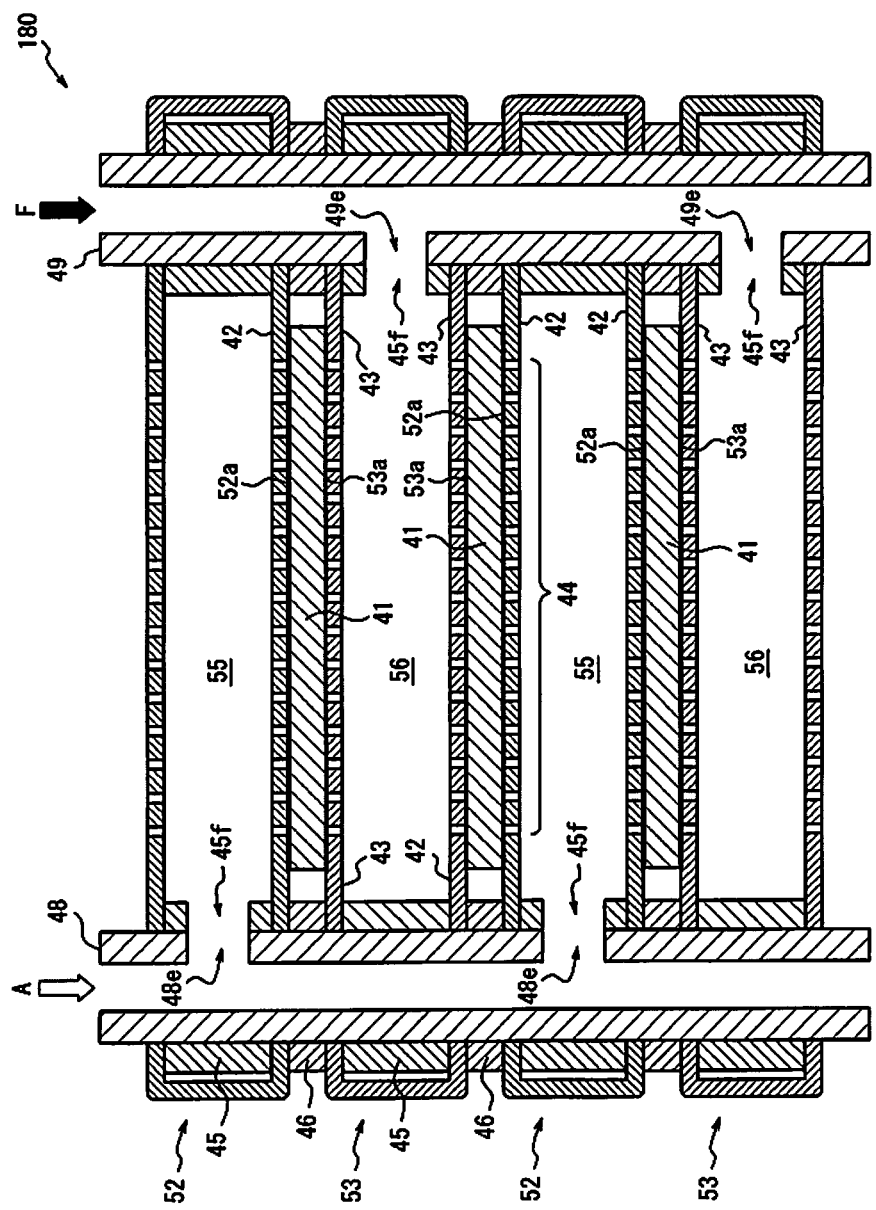
FIG. 34 is a drawing showing the cell stack obtained by the gas supply pipe being inserted in the laminate shown in FIG. 33.

FIG. 34 shows a cell stack 180 obtained after insertion of the gas introduction pipes 48, 49 in the gas circulation ports 42a to 42d of the electrode 42 and the gas circulation ports 43a to 43d of the electrode 43. With the gas introduction pipes 48 and 49, the positions in the axial direction of the openings 48e, 49e are different, and the openings 48e, 49e are connected to respectively different gas flow paths. In the cell stack 180 shown in FIG. 34, the oxidant gas A is introduced from the gas introduction pipe 48, and the fuel gas F is introduced from the gas introduction pipe 49. The operation of the cell stack 180 is the same as that of the cell stack 80 shown in FIG. 22, so an explanation is omitted.

Figure 23:
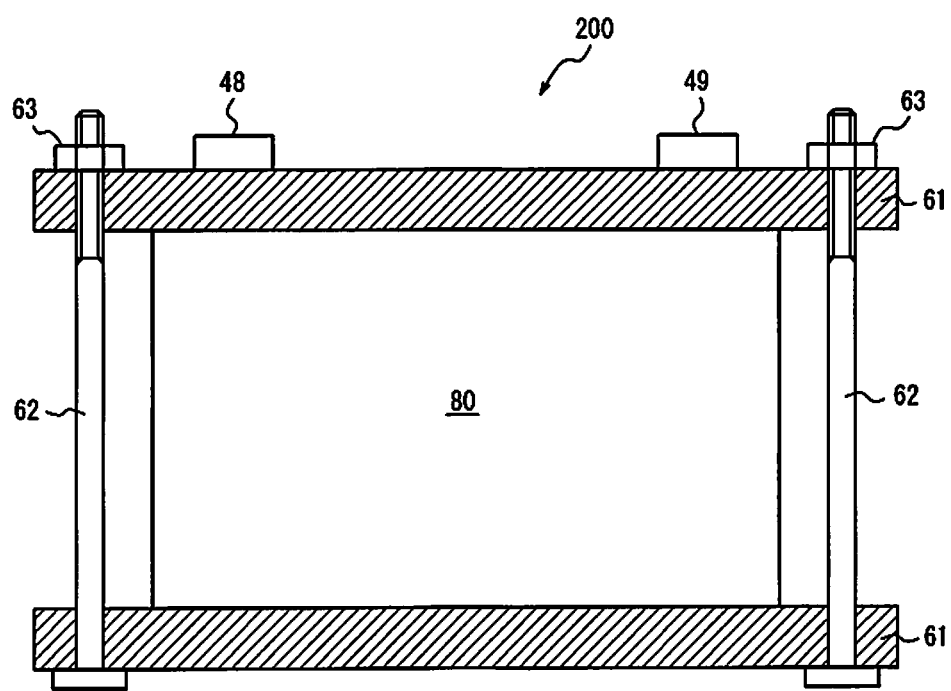
FIG. 23 is a drawing showing the cell stack fixed by end plates.

As shown in FIG. 23, with the cell stack 180 obtained as described above, by being sandwiched by two end plates 61, passing a bolt 62 through the end plates 61, and tightening and fixing using a nut 63, the final cell stack is obtained.

EXPLANATION OF REFERENCE NUMERALS 1, 21, 31, 41: Solid electrolyte layer; 2, 3, 22, 32, 33, 42, 43, 122, 132, 133, 142, 143: Electrode; 2a, 3a, 23a, 24a, 32a, 33a, 52a, 53a: Oxide layer; 4: Support; 5: Electrode layer; 6, 44: Perforated metal; 6a: Opening; 6b, 6c: Material filled in the opening; 10: Bonded body (unit cell); 11: Upper chamber; 12: Lower chamber; 13: Oxidant gas introduction pipe; 14: Oxidant off-gas exhaust pipe; 15, 26, 35, 37, 55: Oxidant gas flow path; 16: Fuel gas introduction pipe; 17: Fuel off-gas exhaust pipe; 18, 27, 36, 38, 56: Fuel gas flow path; 20, 30, 40, 50, 60, 70, 80, 200: Cell stack; 23, 24: Flat plate part; 25: Standing plate part; 34, 45: Separator; 42a, 42b, 42c, 42d, 43a, 43b, 43c, 43d: Gas circulation port; 45a, 46a, 48a, 49a: Top surface; 45b, 46b, 48b, 49b: Bottom surface; 45c: Side surface; 45d, 45e, 46c: Through hole; 46f, 48e, 49e: Opening; 46, 47: Gasket; 47a: Base; 47b: Convex part; 48, 49 Gas introduction pipe; 48c, 49c: Outer surface; 48d, 49d: Inner surface; 52, 53: Electrode body; 61: End plate; 62: Bolt; 63: Nut; A: Oxidant gas; A': Oxidant off-gas; B: Separator contents; C: Recess; F: Fuel gas; F': Fuel off-gas; J: Bonding part; L: Diameter expansion part; P: Electrode plate; T: Separator peak; and V: Voltage application device.

The invention claimed is:

1. A method for bonding a solid electrolyte layer, a cathode and an anode for a fuel cell, comprising:
   laminating the solid electrolyte layer, the cathode and the anode so that the cathode and the anode sandwich the solid electrolyte layer therebetween;
   covalent bonding at an interface between the solid electrolyte layer and one of the cathode and the anode by applying a first DC voltage of a first polarity between the cathode and the anode sandwiching the solid electrolyte layer; and
   covalent bonding at an interface between the solid electrolyte layer and the other one of the cathode and the anode by applying a second DC voltage of a second polarity that is the reverse of the first polarity between the cathode and the anode sandwiching the solid electrolyte layer after completion of the covalent bonding between the solid electrolyte layer and the one of the cathode and the anode.

2. The method for bonding a solid electrolyte layer, a cathode and an anode according to claim 1, wherein
each of the cathode and the anode has a support and an electrode layer on the support.

3. The method for bonding a solid electrolyte layer, a cathode and an anode according to claim 2, wherein
the support has a perforated metal.

4. The method for bonding a solid electrolyte layer, a cathode and an anode according to claim 3, wherein
the support has the perforated metal only on a portion at which the electrode layer contact the solid electrolyte layer.

5. The method for bonding a solid electrolyte layer, a cathode and an anode according to claim 2, wherein
the support has stainless steel.

6. The method for bonding a solid electrolyte layer, a cathode and an anode according to claim 2, wherein
the electrode layer has amorphous silicon or nickel.

7. The method for bonding a solid electrolyte layer, a cathode and an anode according to claim 3, wherein
a porous material functioning as a fuel electrode is filled in openings of the perforated metal of one of the cathode and the anode, and a porous material functioning as an air electrode is filled in openings of the perforated metal of the other one of the cathode and the anode.

8. The method for bonding a solid electrolyte layer, a cathode and an anode according to claim 1, wherein
the laminating of the solid electrolyte layer and the cathode and the anode includes laminating a plurality of solid electrolyte layers and a plurality of pairs of a cathode and an anode to form a plurality of laminates each including one pair of the cathode and the anode sandwiching one of the solid electrolyte layers.

9. The method for bonding a solid electrolyte layer, a cathode and an anode according to claim 8, wherein
the cross section shape of each of the cathode and the anode is a rectangular wave.

10. The method for bonding a solid electrolyte layer, a cathode and an anode according to claim 9, wherein
the laminating of the solid electrolyte layer and the cathode and the anode includes arranging the cathode and the anode sandwiching the solid electrolyte layer so that orientation of the rectangular waves of the cross section shapes of the cathode and the anode are parallel to each other.

11. The method for bonding a solid electrolyte layer, a cathode and an anode according to claim 10, wherein
the laminating of the solid electrolyte layer and the cathode and the anode includes arranging the cathode and the anode sandwiching the solid electrolyte layer so that the phases of the rectangular waves of the cross section shapes of the cathode and the anode are matched to each other.

12. The method for bonding a solid electrolyte layer, a cathode and an anode according to claim 10, wherein
the laminating of the solid electrolyte layer and the cathode and the anode includes arranging the cathode and the anode sandwiching the solid electrolyte layer so that the phases of the rectangular waves of the cross section shapes of the cathode and the anode are the reverse to each other.

13. The method for bonding a solid electrolyte layer, a cathode and an anode according to claim 9, wherein
the laminating of the solid electrolyte layer and the cathode and the anode includes arranging the cathode and the anode sandwiching the solid electrolyte layer so that orientation of the rectangular waves of the cross section shapes of the cathode and the anode cross each other.

14. The method for bonding a solid electrolyte layer, a cathode and an anode according to claim 8, wherein
the laminating of the solid electrolyte layer and the cathode and the anode includes providing a plurality of separators so that one of the separators is disposed between adjacent ones of the laminates, the cross section shape of each of the separators is a triangular wave shape.

15. The method for bonding a solid electrolyte layer, a cathode and an anode according to claim 14, wherein
the providing of the separators includes arranging the separators such that for opposing ones of the separators sandwiching one of the laminates, orientation of the triangular waves of the cross section shapes of the separators are parallel to each other.

16. The method for bonding a solid electrolyte layer, a cathode and an anode according to claim 15, wherein
the providing of the separators includes arranging the separators such that the phases of the triangular waves are matched to each other.

17. The method for bonding a solid electrolyte layer, a cathode and an anode according to claim 15, wherein
the providing of the separators includes arranging the separators such that the phases of the triangular waves are the reverse to each other.

18. The method for bonding a solid electrolyte layer, a cathode and an anode according to claim 14, wherein
the providing of the separators includes arranging the separators such that for opposing one of the separators sandwiching one of the laminates, orientation of the triangular waves of the cross section shapes of the separators cross each other.

19. The method for bonding a solid electrolyte layer, a cathode and an anode according to claim 8, wherein
adjacent ones of the cathode and the anode disposed between adjacent ones of the laminates are bonded to each other at peripheral edge parts.

20. The method for bonding a solid electrolyte layer, a cathode and an anode according to claim 19, wherein
the cathode and the anode have four gas circulation ports.

21. The method for bonding a solid electrolyte layer, a cathode and an anode according to claim 20, further comprising
providing a plurality of separators each having a top surface, a bottom surface, and a side surface, with each of the separators defining two through holes passing through the top surface and the bottom surface, and an opening provided on the side surface in communication with one of the two through holes, and
the laminating of the solid electrolyte layer and the cathode and the anode includes arranging two of the separators between adjacent ones of the laminates such that the gas circulation ports adjacent in the laminating direction of the laminates are in communication with each other via the through holes of the separators and that the openings of the separators face each other, and the separators adjacent in the laminating direction of the laminate are placed such that the separators are vertically inverted to each other.

22. The method for bonding a solid electrolyte layer, a cathode and an anode according to claim 21, further comprising
providing a plurality of gaskets each having a top surface and a bottom surface, with each of the gaskets defining through holes that pass through the top surface and the bottom surface, and
the laminating of the solid electrolyte layer and the cathode and the anode includes arranging the gaskets between the cathode and the anode sandwiching the solid electrolyte layer such that the gas circulation ports adjacent in the laminating direction are in communication with each other via the through holes of the gaskets.

23. The method for bonding a solid electrolyte layer, a cathode and an anode according to claim 22, wherein
at least one of each of the cathode and the anode and each of the gaskets has a part that suppresses expansion of the through holes of the gasket.

24. The method for bonding a solid electrolyte layer, a cathode and an anode according to claim 22, further comprising
providing four gas introduction pipes each having a top surface, a bottom surface, an outer surface, and an inner surface, and having a plurality of openings that pass through the outer surface and the inner surface, where with two and the other two of the four gas introduction pipes, positions of the plurality of openings are different with respect to an axial direction of each of the gas introduction pipes, and
inserting the gas introduction pipes in the gas circulation ports via the through holes of the separators and the through holes of the gaskets, and so that the openings of the gas introduction pipes and the openings of the separators overlap respectively.

25. The method for bonding a solid electrolyte layer, a cathode and an anode according to claim 24, further comprising
sandwiching and fixing the plurality of laminates using two end plates.

26. A method for manufacturing a fuel cell comprising:
bonding one or more solid electrolyte layers and a plurality of pairs of a cathode and an anode using the method for bonding a solid electrolyte layer and a cathode and an anode according to claim 1.

27. A fuel cell manufactured using the method for manufacturing a fuel cell according to claim 26.

* * * * *